(12) United States Patent  
Cambron

(10) Patent No.: US 6,539,027 B1  
(45) Date of Patent: Mar. 25, 2003

(54) RECONFIGURABLE, INTELLIGENT SIGNAL MULTIPLEXER AND NETWORK DESIGN AND MAINTENANCE SYSTEM THEREFOR

(75) Inventor: G. Keith Cambron, Alameda, CA (US)

(73) Assignee: Coastcom, Alameda, CA (US)

( * ) Notice: Subject to any disclaimer, the term of this patent is extended or adjusted under 35 U.S.C. 154(b) by 0 days.

(21) Appl. No.: 09/232,611

(22) Filed: Jan. 19, 1999

(51) Int. Cl.$^7$ ............................................... H04B 7/212
(52) U.S. Cl. ...................................... 370/442; 370/400
(58) Field of Search ................................ 370/441, 442, 370/423, 463, 250, 360, 437, 535, 539, 541, 227, 228, 408; 709/221, 223, 233, 278; 714/7

(56) References Cited

U.S. PATENT DOCUMENTS

| | | | | |
|---|---|---|---|---|
| 5,166,925 A | * | 11/1992 | Ward | 370/250 |
| 5,796,729 A | * | 8/1998 | Greaney | 370/345 |
| 5,887,158 A | * | 3/1999 | Sample | 716/15 |
| 5,901,323 A | * | 5/1999 | Milliken | 709/321 |
| 6,003,077 A | * | 12/1999 | Bawden | 709/223 |
| 6,145,072 A | * | 11/2000 | Shams | 712/22 |
| 6,260,155 B1 | * | 7/2001 | Dellacona | 714/4 |
| 6,377,543 B1 | * | 4/2002 | Grover | 370/227 |
| 6,389,464 B1 | * | 5/2002 | Krishnamurthy | 709/220 |
| 6,421,349 B1 | * | 7/2002 | Grover | 370/408 |

* cited by examiner

Primary Examiner—Douglas Olms
Assistant Examiner—Ricardo M. Pizarro
(74) Attorney, Agent, or Firm—Harris Zimmerman, Esq.

(57) ABSTRACT

A modular, reconfigurable, intelligent signal multiplexer for telecommunications purposes includes a rack or shelf adapted to support a plurality of printed circuit cards. The cards include feature cards and line cards, and at least one central controller card. All of the cards includes backplane connectors to connect to customer premises equipment and to telecommunications lines, and midplane connectors to interconnect all of the circuit cards for data exchange under program control. Each feature card contains an embedded microprocessor with associated embedded operating system, as well as RAM memory and flash RAM. The signal multiplexer processes digital inputs from a wide range of user equipment for transmission over digital facilities, including T1 and T3 lines. The system employs an Advanced Intelligent Multiplexer Network software package to perform network configuration and SNMP to obtain performance reports, statistics collection and alarm monitoring. SNMP is accessed through a software package having an intuitive graphical interface for network planning and design, routing and inventory-management support. The functions of the signal multiplexers are controlled by a mapping scheme. A map change alters the circuit-to-time slot assignments. A large number of maps may be stored by the system, and may be set to start running in response to user-specified times, a predetermined event, an alarm, or a manual keyboard command. The graphical interface also presents screen displays that enable network design, node configuration, and alteration of an existing network.

41 Claims, 26 Drawing Sheets

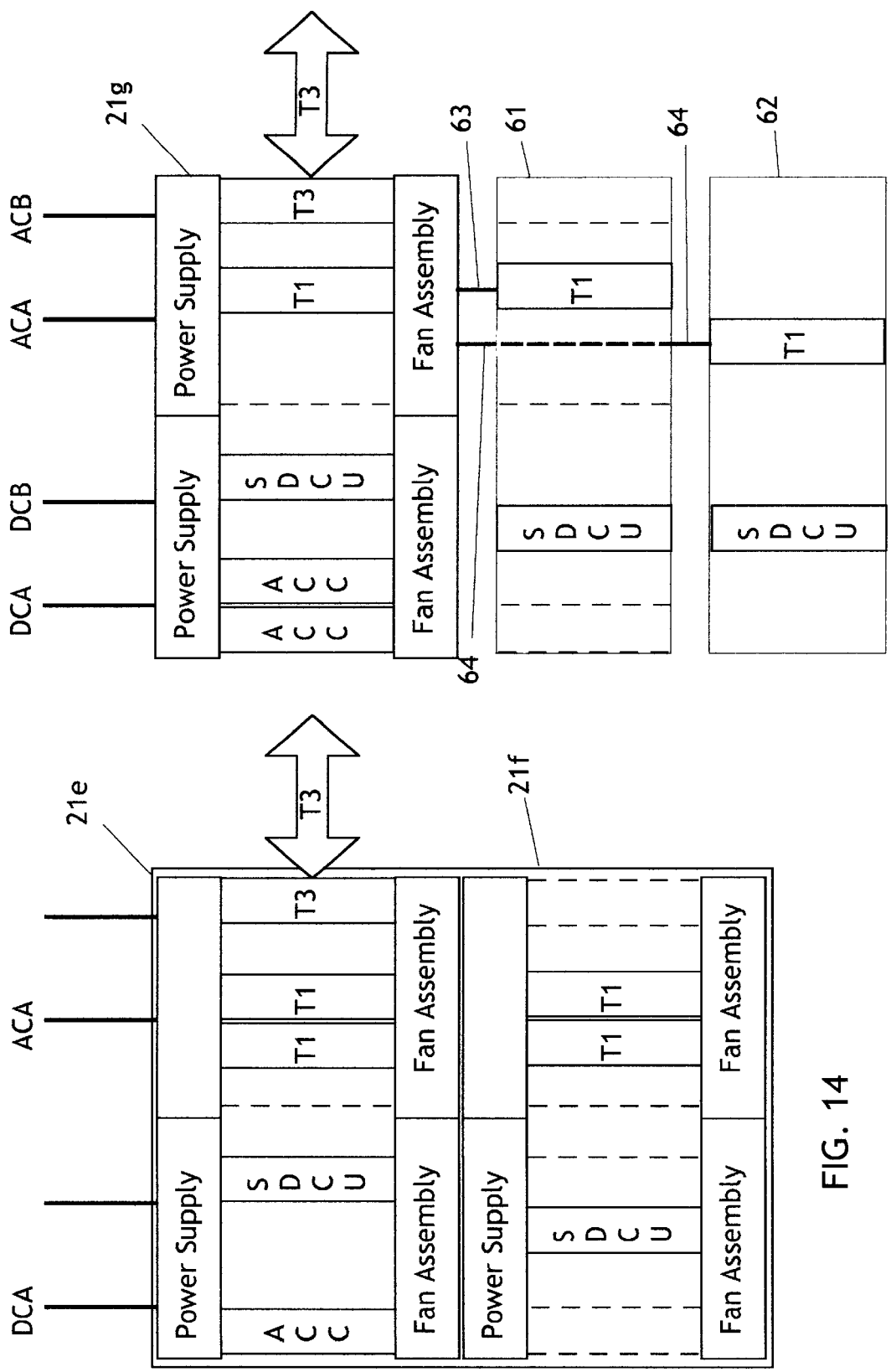

RECONFIGURABLE, INTELLIGENT SIGNAL MULTIPLEXER AND NETWORK DESIGN AND MAINTENANCE SYSTEM THEREFOR

BACKGROUND OF THE INVENTION

In the early part of the 20th century, long-distance telephone companies, primarily AT&T/Bell Telephone, made significant investments to establish an infrastructure of trunk lines running between the major cities. During the past 30 years, telephone companies have sought to upgrade this infrastructure with systems capable of high-speed digital connections.

To accomplish this conversion, trunk circuits and switching systems have been redesigned from analog to digital equipment. In older analog systems, each wire pair in the copper cable comprised a dedicated circuit supporting only one voice or data connection. Because of the high cost of copper cable, special equipment was developed to carry more than one speech conversation on a pair of wires. This technique, known as multiplexing, combines the data from several telecommunications devices onto one communications circuit. At the other end of the circuit, another multiplexer splits the data and routes it appropriately. The two common types of multiplexing are frequency multiplexing and time division multiplexing. Frequency division multiplexing, which involves dividing a trunk line's available bandwidth into discrete frequency bands, was used for transmitting multiple analog circuits via one pair of twisted copper wires. Time division multiplexing (TDM), which allocates discrete, reiterated time slots for each circuit, was developed to accommodate multiple digital transmission services sent over a single circuit.

In conjunction with TDM, the T1 digital carrier system was developed in the 1960's as a short distance transmission system for carrying digital signals over a single twisted pair of copper wires without interference. The bandwidth of a T1 line is 1.54 Mbps, yielding a capacity for 24 64 kbps digital channels and 8 kbps for keeping the ends of the trunk synchronized by imposing a framing process. To make use of the T1 system, voice signals are required to be converted into digital format, generally using a pulse code modulation (PCM) encoding scheme.

Conversion of voice and other analog sources to digital format is carried out by a channel bank, which samples each of the 24 analog circuits at a rate of 8000 times per second to produce a snapshot of the analog signal at precisely synchronized instants. The amplitude of the snapshot is rounded off the nearest of several specific, predetermined levels, in a quantization process. The quantized snapshot level is converted into an 8 bit binary representation of the analog signal. Thus, every channel is represented by an 8 bit PCM byte for analog signals, or one data byte for digital signals.

The term 'channel bank' is used because it may contain sufficient processing power to encode to digital format a bank of up to 24 individual channels per T1 port, and to decode these channels as well. Thus one channel bank encoding up to 24 channels may generate the composite digital signal to feed one T1 circuit, and a channel bank is required at either end of the T1 circuit.

Modern T1 circuits are formed by two twisted-pair cables (four wires total), enabling nodes at either end of a T1 line to transmit and receive in both directions simultaneously in full duplex mode. A T1 multiplexer divides a T1 line into 24 separate 64 kbps channels, each channel comprising a digital signal level 0 (DS-0). The multiplexed T1 signal format is termed digital signal level 1 (DS-1). The T1 digital carrier system can carry both data and nondata traffic, such as voice and video, because all these types of transmitted information can be digitally encoded. Therefore, the T1 line can carry "integrated" traffic so that a customer does not need to have separate lines (or trunks) for voice, video, and data.

A multiplexer placed at each end of a T1 line acts like a funnel allowing multiple sources and formats to be mixed at the transmitting end and to be extracted and appropriately routed at the receiving end. A T1 multiplexer typically consists of a T1 interface, a strobe unit, a power source, and control logic. Multiplexer devices also usually contain open slots to accommodate various types of channel cards, such as circuit cards or feature cards. The two most common types of channel cards are designed to support voice or data applications. A voice card provides a connection to an analog circuit, and carries out the digital to analog and analog to digital conversions. A data card provides a connection to a digital circuit, and may reformat or reframe the signal. The T1 multiplexer combines the digital signals from the voice and data channel cards and combines them into a single 1.544 Mbps circuit of 24 DS-0s.

For users who need less than 1.544 Mbps bandwidth, telecommunication companies offer fractional T1 service, allowing users to pay for the portion of the T1 bandwidth they use. This approach makes leased services more affordable for small businesses. For users who require more than the T1 bandwidth, telecommunications companies offer T3 trunks with a capacity of 28 multiplexed T1 lines, equivalent to 672 DS-0s, with a bandwidth of 44.7 Mbps. The T3 line is referred to as a digital signal level 3 (DS-3) channel.

Although the multiplexing and transmission of telecommunications traffic appears straightforward in conceptual terms, the actual task of setting up and managing a telecommunications system is extremely complex. A wide variety of input signals must be accepted, such as analog and digital voice, data, video, fax, modem, LAN/WAN, internet and intranet, and the like. These inputs may have differing protocols, framing, and timing, and must be reliably synchronized, transmitted and decoded. Circuits must be set up and maintained without interruption or fault, and signals must be routed to and from a large number of telecommunications devices. Bandwidth requirements may change on a regular basis, according to workday schedules, or may change abruptly due to unexpected demands. At any node on a transmission system, some channels may be required to be unloaded and replaced with other signals, whereas other channels may be passed through the node without alteration. These factors all contribute to an extremely complex signal processing environment.

SUMMARY OF THE INVENTION

In one aspect, the present invention generally comprises a modular, reconfigurable, intelligent signal multiplexer for telecommunications purposes. The multiplexer is comprised of a rack or shelf adapted to support a plurality of printed circuit cards. The cards may include feature cards, such as line cards, and at least one central controller card. All of the cards includes backplane connectors that are adapted to connect to customer premises equipment and to telecommunications lines and networks. The cards further include midplane connectors that are adapted to interconnect all of the circuit cards for data exchange under program control.

Each feature card also contains an embedded microprocessor with associated embedded operating system, as well as RAM memory and flash RAM. Consequently, all cards are software-independent, thereby reducing or eliminating the need for systemwide software upgrades. This design also facilitates system upgrades and new feature card installation without requiring new common equipment. Software control of the feature cards resides in the cards themselves, instead of residing within the central controller card.

The signal multiplexer processes digital inputs from a wide range of user equipment for transmission over digital facilities, including T1 and T3 lines. The trunk bandwidth is managed with programmable bandwidth allocation, which enables the service provider to allocate bandwidth to specific customers on an as-needed basis, and to alter the bandwidth allocation virtually instantaneously. The system employs a Simple Network Management Protocol (SNMP) to perform network configuration as well as to obtain performance reports, statistics collection and alarm monitoring. SNMP is accessed through a SNMP network manager or web browser that provides an intuitive graphical interface for network routing and inventory-management support. In this regard, the central controller card provides all common, management plane control functions, and is provided with a SNMP master agent and an on-board Web server that works with SNMP via a non-graphic terminal interface. Each feature or line card is provided with a SNMP agent on-board. The central controller card also has an on-board modem, and users can control the multiplexer functions from one central workstation, using a LAN or PPP connection.

SNMP is a standardized software package for managing network equipment, and is designed to facilitate the exchange of information between network devices. Network components from a plurality of manufacturers can be controlled using SNMP, as long as all the components support SNMP. The system requires a single SNMP manager or master agent at a central management site and a SNMP subagent at each component site, and a suitable data path therebetween.

The primary function of the signal multiplexer, which is assembly and transmission of telecommunications signals, is achieved by a mapping process in which all of the DS-0 time slots of the T1/T3 lines are assigned to the line cards. A map change alters the circuit-to-time slot assignments, and, by changing to a new working map, the system is able to change time slot assignments without causing data errors on unchanged DS-0s. A large number of maps may be stored by the system. Maps are set to start running in response to user-specified times, a predetermined event, an alarm, or a manual keyboard command. Maps may be set, changed, and verified using standard and enterprise MIBs, through the graphical user interface and verified by SNMP.

Time-triggered maps reconfigure the multiplexer automatically at a specified time. For example, voice circuits can be decreased, and high speed data capacity can be increased for evening and weekend operations, when few employees are using voice circuits. This feature allows data backups and file transfers to be processed more quickly during off-peak hours. Event-triggered maps are switched on by an event, such as a disaster situation or a demand requirement; e.g., a video transmission or the like. Alarm-triggered maps are switched on by predetermined alarm conditions, such as Bit Error Rate Alarm, or Red or Yellow Alarms. The system supports common Bell System alarms, including Local alarm, Remote alarm, and Carrier Group Alarm (CGA).

The use of the graphical user interface network manager (hereinafter, Advanced Intelligent Multiplexer Network, or AIMNET) in conjunction with the system mapping approach enables the intelligent multiplexer to provide unique features not found in the prior art. Functions such as drop-and-insert multiplexing, digital cross-connect, and virtually instantaneous reconfigurability may be applied to the transmission system through AIMNET management software.

In another aspect of the invention, the user interface software includes a graphical user interface that presents iconic representations of network connections, and enables the user to define nodes and draw graphic links therebetween on a video display. The network layout software then facilitates the design of the network nodes and connections using a graphic interactive presentation to the user. The user can specify the number of line cards in each intelligent multiplexer at each node and the node connections, and can move and re-arrange these objects on-screen. After the network topology is laid out on-screen, the user may add spans, which are actual circuits, to the links, which are logical pathways. Spans may include T1 and T3 circuits.

The program requires that sufficient line cards are present at each node to support the spans added on-screen. In this regard, the program also provides a pop-up context menu that permits the user to modify the equipment at each node during the process of laying out the spans of the network. The program also provides interactive screen displays that enable selection of span configurations, source node and destination node, source card/port and destination card/port, and type (T1, T3, etc.). The user can first select the type of span they wish to add, and the software searches both nodes for compatible line interface units, and then displays the first compatible card it finds as well as the card information, including slot number, port number, and available bandwidth.

Users can navigate through the ports on the cards, or through the cards themselves, using an up/down spinner control. The availability of the ports for interconnection is indicated by the color of arrows displayed in a dialog box: yellow to indicate that connection is possible at the bandwidth shown, red to show that a connection is not possible because the respective port is already connected in another span, and green to indicate that two ports are already connected on the selected span. The system includes follow-on interactive screen displays to enable port connections, and trunk connections. Once the design is completed on-screen, it must be translated into an appropriate map and sent to all the nodes, using a combination of User Datagram Protocol (UDP) and Transmission Control Protocol (TCP). These maps can include time of day and day of week constraints.

At the real nodes which correspond to the graphical node representations used in the on-screen design process, each node is polled to verify that all the cards assignedto each node are actually in place, and that the card slots are properly configured. Node configuration data is displayed on-screen, and update requirements may be entered. Likewise, routing tables for each node may be received, examined, and updated. The network design may then be implemented. As noted above, maps formed in the process described above may be stored, and invoked or swapped automatically, or in response to an alarm condition, or by manual command.

Each feature card may be addressed individually, so that line cards may be remapped individually and/or serially, or may be remapped simultaneously. If only one or more line card is altered, the remaining cards may remain in operation without interruption. This permits "hot-swapping" or addition and replacement of line circuit cards while the multiplexer remains in full running status.

The use of the graphical user interface network manager AIMNET in conjunction with the system mapping approach also enables fault tolerant design features not found in the prior art. The network manager may be used to assign a priority value to any channel connected thereto. If one or more of the internode spans becomes non-functional or unavailable, this occurrence is treated as a triggering event, and AIMNET responds by rerouting the channels on the functioning spans so that communications traffic having higher priority is routed first, while the lowest priority traffic may be sacrificed. AIMNET can also configure a system to operate in a redundant mode, in which each node operates with fully duplicated critical components: two power supplies and fan assemblies, and two central controller circuit cards. If a critical component fails, the system will switch to the backup component with a minimum of disruption. Likewise, a node may be configured with redundant T-3 line interface cards, one being active and the other being standby. In the event of a failure of the active LIU, the central controller of the node will detect the failure, activate the standby LIU and remap all circuits to the newly activated card.

The system may also be set up as an active ring, in which a plurality of D/I MUX nodes has incoming and outgoing T-1 spans connected to other nodes in a closed loop that includes one fully configured AIM node. Each node is assigned channels from the 24 available and operates in a drop-and-insert mode. In the event of a T-1 span failure, the fully configured node will loop its transmit and receive circuit to reconstitute the loop, and operation will resume with little disruption.

BRIEF DESCRIPTION OF THE DRAWING

FIGS. 5-1 to 5-15 are a sequence of views of screen displays (screen shots) provided by the graphical user interface of the user control software package.

FIG. 6 is a function block diagram depicting the operating relationship between the reconfigurable intelligent multiplexer and the associated telecommunications network and the graphical user interface.

FIG. 7 is a function block diagram illustrating the operation of a typical line card of the reconfigurable intelligent multiplexer of the invention.

FIG. 8 is a functional block diagram of the channel bank operation of the reconfigurable intelligent multiplexer of the invention.

FIG. 9 is a function block diagram of the M13 multiplexer operation of the reconfigurable intelligent multiplexer of the invention.

FIG. 10 is a function block diagram of the digital cross-connect operation of the reconfigurable intelligent multiplexer of the invention.

FIG. 11 is a functional block diagram depicting the routing and priority assignments of a three node ring communications system constructed in accordance with the invention.

FIG. 12 is a block diagram depicting a typical fault tolerant redundant configuration of a reconfigurable intelligent multiplexer node of the invention.

FIG. 13 is a block diagram depicting a typical fault tolerant redundant configuration of a T-3 span reconfigurable intelligent multiplexer node of the invention.

FIG. 14 is a block diagram depicting a typical non-fault tolerant simplex configuration of a T-3 span reconfigurable intelligent multiplexer node of the invention.

FIG. 15 is a block diagram depicting a typical high bandwidth D/I MUX hub configuration of a T-3 span reconfigurable intelligent multiplexer node of the invention.

DESCRIPTION OF THE PREFERRED EMBODIMENT

Figure 1:
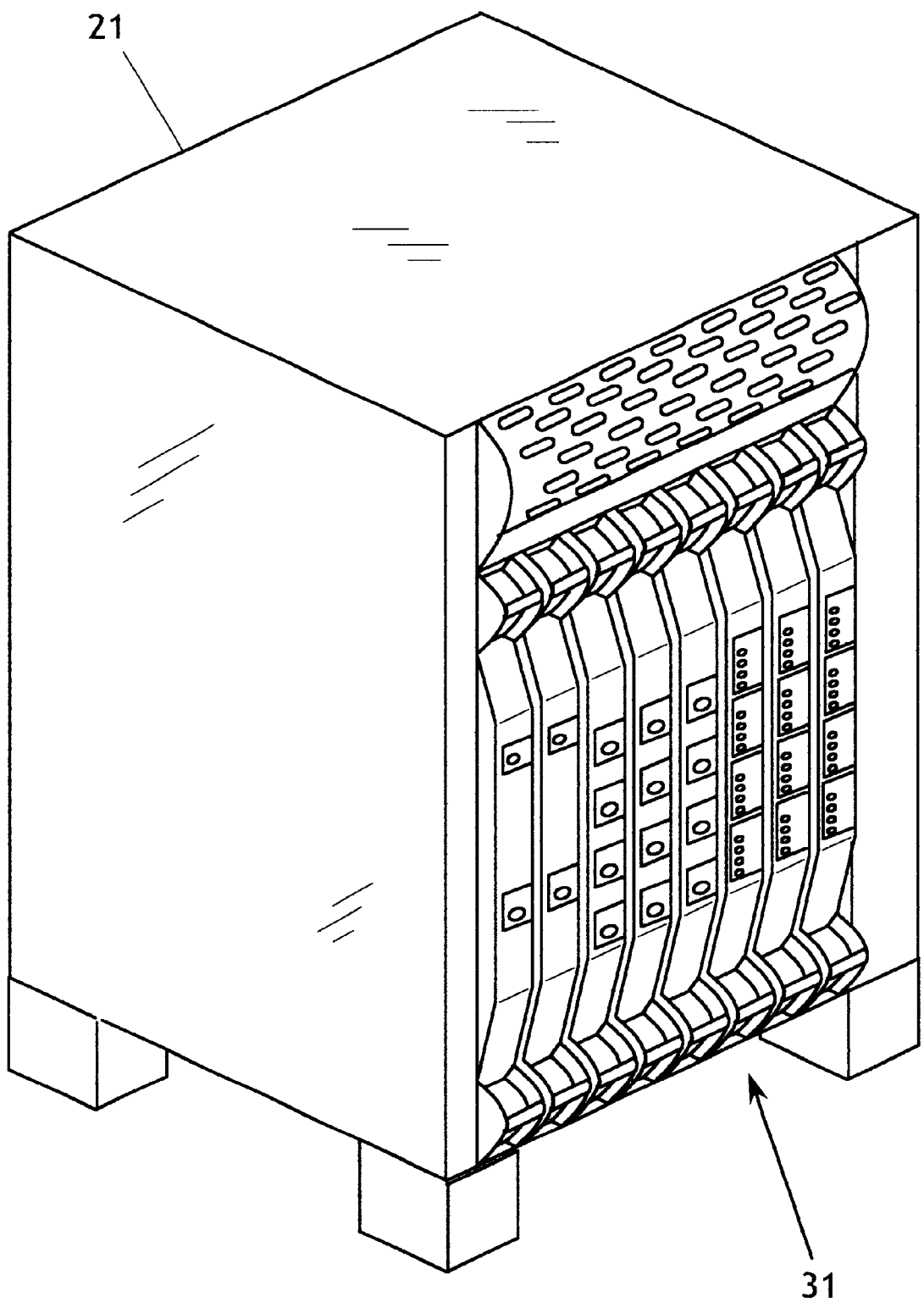
FIG. 1 is a perspective view of the reconfigurable intelligent multiplexer of the present invention.

The present invention generally comprises in one aspect a modular, reconfigurable, intelligent signal multiplexer for telecommunications purposes. With regard to FIGS. 1 and 2, the multiplexer includes a cabinet housing 21 enclosing a shelf structure 22. The shelf 22 defines a plurality of card slots 23 in parallel array, each slot 23 including one or more backplane connectors 24. In addition, each slot 23 includes one or more midplane connectors 26. All of the slots 23 are substantially identical in configuration. The backplane connectors 24 preferably comprise standard telecommunications connectors, and the midplane connectors 26 comprise standard data connectors.

The intelligent multiplexer also includes a plurality of circuit cards 31 having substantially identical conformations, the circuit cards 31 being configured to be placed in any of the slots 23 of the shelf 22 in interchangeable fashion. Each circuit card 31 includes one or more backplane connectors 32 projecting from a lower interior edge thereof and adapted to mate with the backplane connectors 24 of the shelf unit 22. Likewise, each circuit card 31 is provided with one or more midplane connectors 33 extending from the upper and medial portions of the interior edge of the card and adapted to mate with the midplane connectors 26 of the shelf unit 22. The backplane connectors 24 are joined to telecommunications circuits extending to public or private carrier lines, as well as to customer equipment such as telephones, LAN/WAN, modems, fax machines, and any other signal that may be carried by telecommunications circuits. The midplane connectors 26 are interconnected among the slots 23 to provide data communication between and among the circuit cards 31 placed into the unit, and also provide power connections. Thus any circuit card 31 may be placed in any of the slots 23 and be connected to electrical power, joined to the other circuit cards in data communication, and connected to incoming/outgoing telecommunications circuits. The shelf 22 also includes at least one power supply for the circuit cards 31 and a fan assembly to remove heat and maintain proper operating temperatures.

Each of the line cards 31 include an embedded microprocessor, such as a Motorola 68000-series device, with an associated operating system, as well as RAM memory and flash RAM. Two categories of circuit cards 31 are provided: central controller cards, and feature cards. Feature cards may include line cards, channel bank cards, and the like, as described in the following specification. A minimum configuration of the intelligent multiplexer system comprises at least one central controller card, and at least one feature card. A significant aspect of the invention is that the system may be expanded or reconfigured as required by the telecommunications tasks assigned to the intelligent multiplexer. In this regard, the provision of a microprocessor and operating system on each circuit card 31 renders the cards software independent and capable of reconfiguration without requiring new common equipment or system wide software upgrades.

Figure 3:
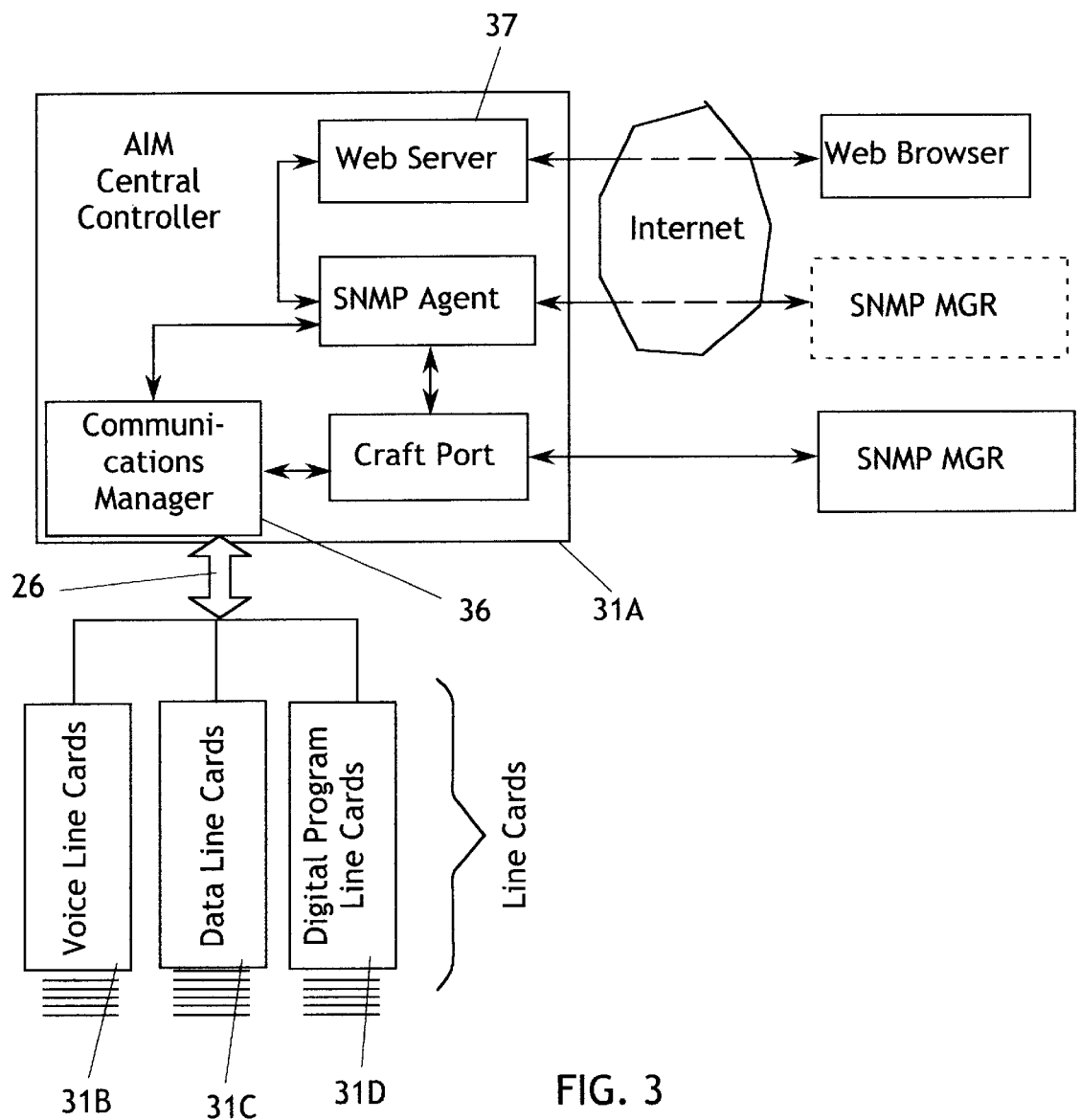
FIG. 3 is functional block diagram depicting the operational scheme of the reconfigurable intelligent multiplexer of the invention.

With regard to FIG. 3, a central controller card 31A is configured to provide a communications manager 36 which delivers all messages among the other circuit cards 31 through the midplane connectors 26. The other circuit cards may comprise voice line cards 31B, data line cards 31C, digital program line cards 31D, and other feature cards described below. The central controller 31A also includes a web server 37 which acts as an Internet gateway by implementing the http protocol, and a SNMP Agent which is connected through the telecommunications lines of the backplane connectors 24 and the Internet (or equivalent network) to an external web browser and to a SNMP Manager. Each feature card and line card is provided with an SNMP Sub-Agent. The SNMP Agent or Sub-Agent acts as a server for interchanging system specific data (SNMP Management Information Base Objects) with SNMP Managers located outside the central controller card. SNMP is an acronym for Simple Network Management Protocol, an ANSI standard protocol for network control. SNMP is implemented commercially in the application Open View™, produced by the Hewlett Packard Corporation, or Net Manager™, produced by Sun Microsystems Corporation. An external computer hosting the Manager may be linked to the central controller through an Ethernet or 10base-T network for these control, functions.

The SNMP network-management architecture contains three primary elements: a manager, agents, and a Management Information Base (MIB). The SNMP manager is the interface through which the network administrator performs network management functions, such a fault, configuration, security, performance, and accounting management. SNMP managers are software products from different companies designed in standardized format to run on almost any kind of computer. Any of these managers can control any kind of device, assuming the devices are designed to support SNMP. SNMP agents and sub-agents are the entities that interact with the devices being managed. All SNMP-compatible devices support a SNMP software agent, which enables a management station to poll all SNMP devices in a network.

Information regarding network status is collected in the MIB. The MIB contains variables (also termed 'objects') as defined by the managed device so they can be read or set by the manager to monitor or control the managed equipment. MIBs are text files written a special, stylized language that the manager software can parse and use. A MIB is essentially a database of objects arranged as a tree. At the top of the MIB tree is the most general information available about a network. Each branch of the tree then gives more detail about a specific network area, with individual data items as leaves on a branch. Object identifiers uniquely identify MIB objects in the tree.

Two kinds of MIBs are used: Standard and Enterprise. Standard MIBs are generic information bases describing common features of many equipment types. Examples of standard MIBs include MIB-II and the DS-1 MIB. MIB-II describes various system-level objects, as well as many aspects of the management interfaces and the protocols themselves. MIB-II is supported by most of the devices that support SNMP. The DS-1 MIB has some common variables relevant to T1 and E1 lines. MIB-II and the DS-1 MIB are described and included in the Request for Comments (RFC) documents RFC 1213 and RFC 1406, and are available to the public on the Internet. Standard MIBs are widely available, and SNMP managers may typically include a selection of common MIB files. Enterprise MIBs are privately maintained MIBs, which are specific to individual manufacturers and equipment, and are distributed by the organizations responsible for them.

SNMP commands are usually queries from the manager to the agents on the network. SNMP managers are constantly polling agents for network status variables. SNMP transactions may include a GET, a SET, or a TRAP, as follows. The manager sends GET commands to the agent to ascertain the current configuration or state of the managed element. Specifically, the manager sends a GetRequest or GetNextRequest to the agent, the agent inspects the value of the requested MIB variables and then the agent sends a GetResponse to return the requested variables. The manager also sends SET commands to the agent to modify variables within the MIB. That is, the manager sends a SetRequest to the agent, which then alters the MIB variable(s) as instructed. The agent may send TRAPs to notify the manager of alarms, threshold crossings, restarts, and security breaches. The TRAP message is an exception to the SNMP transaction pattern, in that the TRAP is an unsolicited message sent from the agent to the manager.

The user interface software package supports MIB-II and some variables (objects) of the DS-1 MIB. It also supports an enterprise MIB to give SNMP access to the unique aspects of the intelligent multiplexer of the invention, as described below.

The central controller also is provided with a craft port, a serial port that provides direct access to the central controller for users that do not have computers compatible with internet, Ethernet, or 10base-T protocols. The craft port may comprise a standard RS-232C, 9 pin connector which is adapted to be connected to a non-graphic interface terminal, such as a VT-100 or VT-220 terminal or terminal emulator or the like for monitoring and control purposes.

Figure 4:
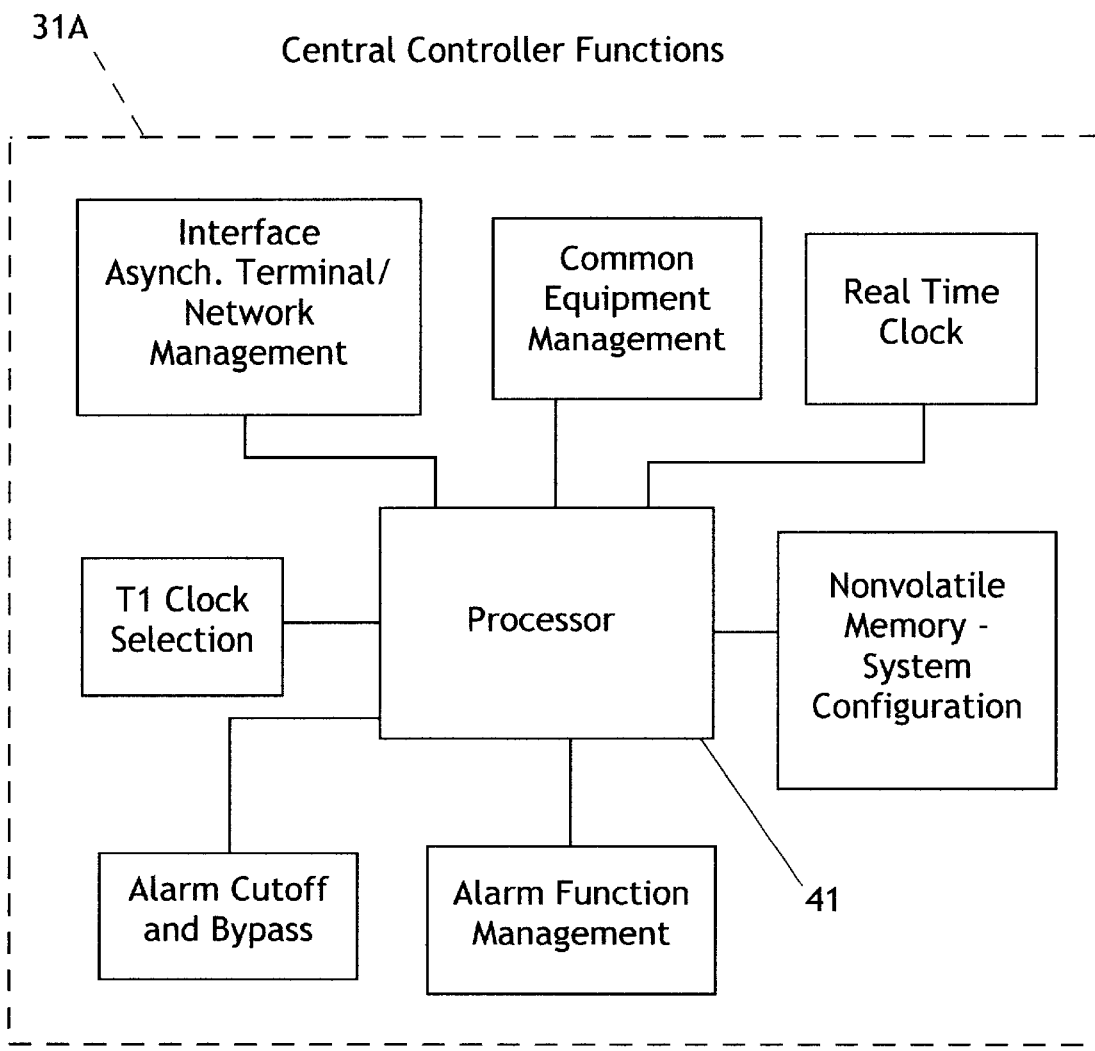
FIG. 4 is a functional block diagram depicting the operational scheme of the central controller of the reconfigurable intelligent multiplexer of the invention.

As illustrated conceptually in FIG. 4, the functions of a central controller card 31 A, managed by the processor 41, include providing an interface for an asynchronous terminal or a network management system. In addition, the central controller controls and monitors other common equipment and feature cards, and provides a real time clock. It also provides control of T1 clock selection, and controls alarm cutoff and bypass functions. The central controller manages all alarm functions, and also maintains a nonvolatile memory storage of the system configuration.

Figures 1, 5:
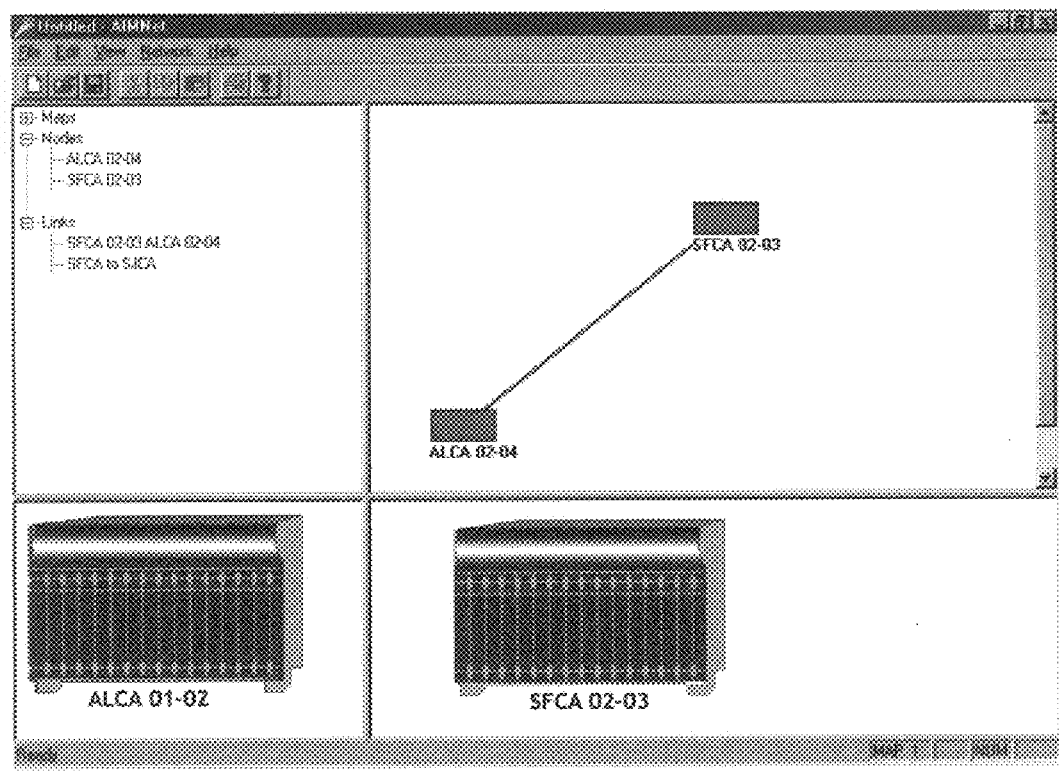
Figures 2, 5:
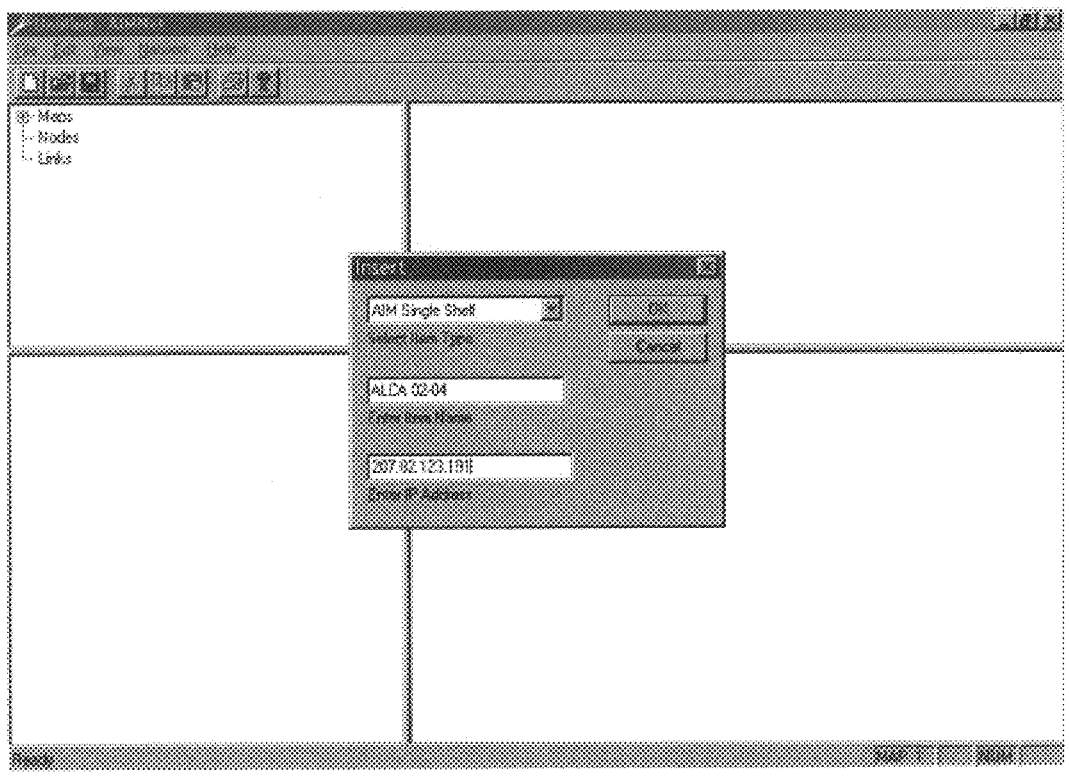
Figures 3, 5:
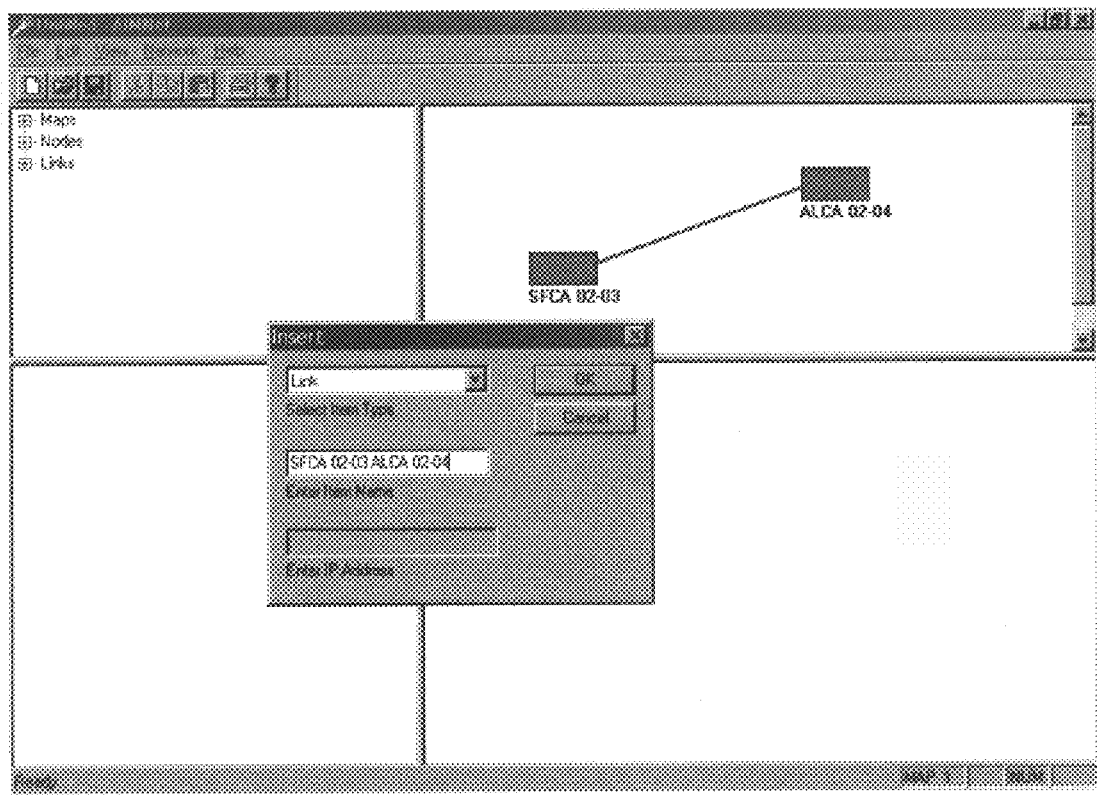
Figures 4, 5:
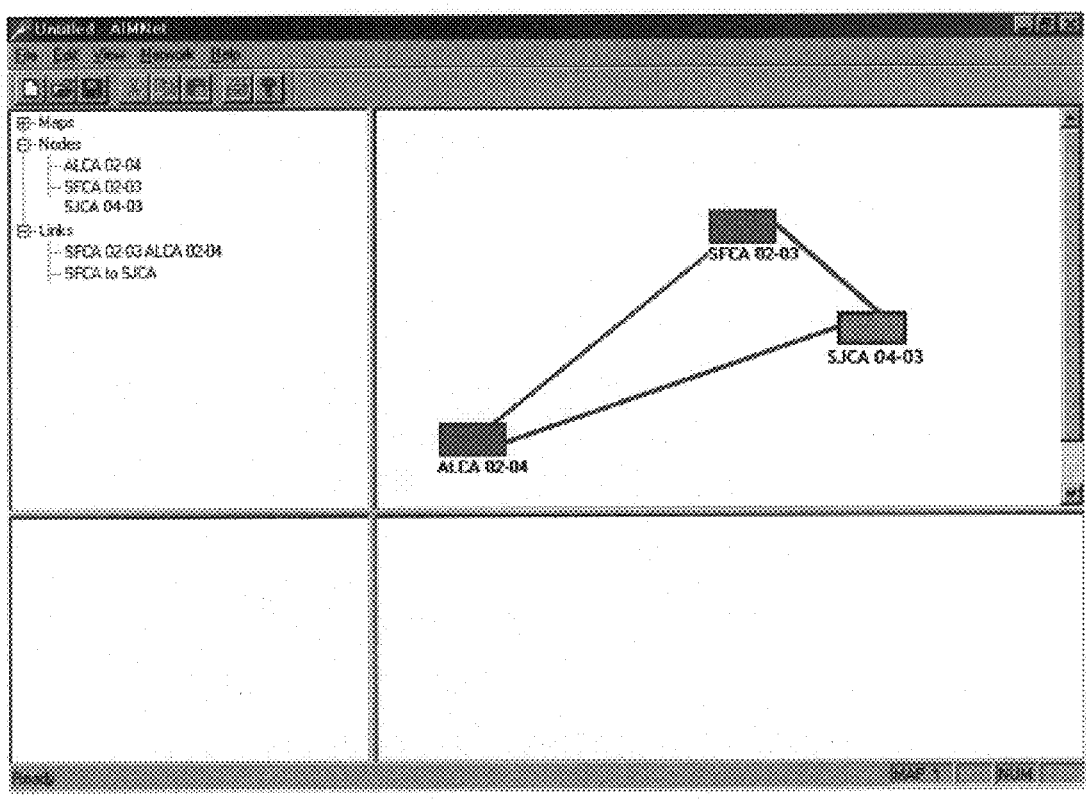
Figure 5:
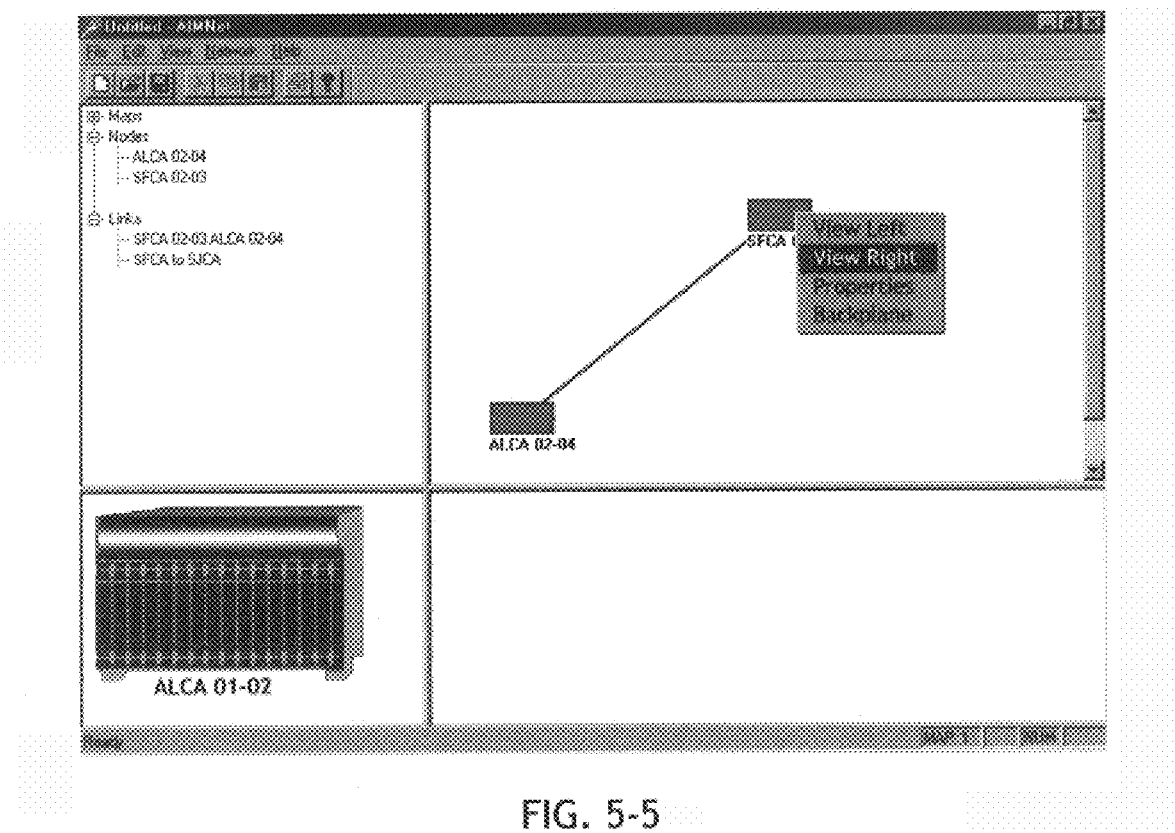
Figures 5, 6:
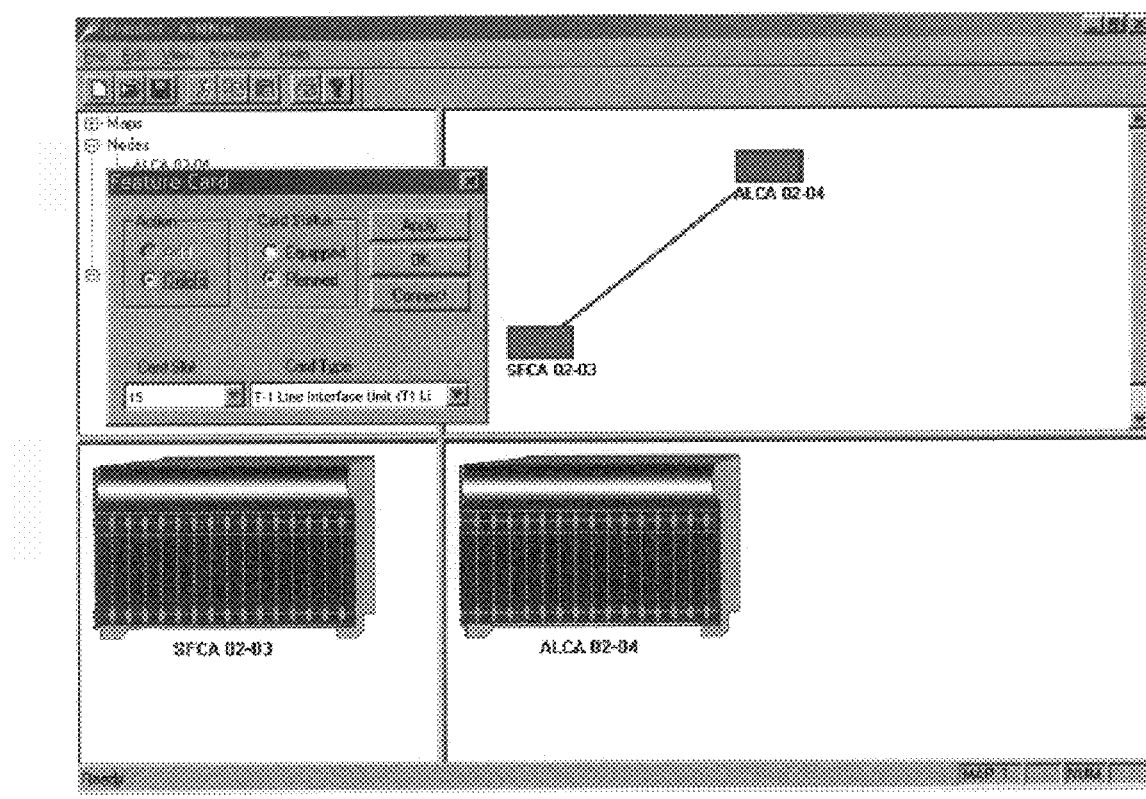
Figures 5, 6, 7:
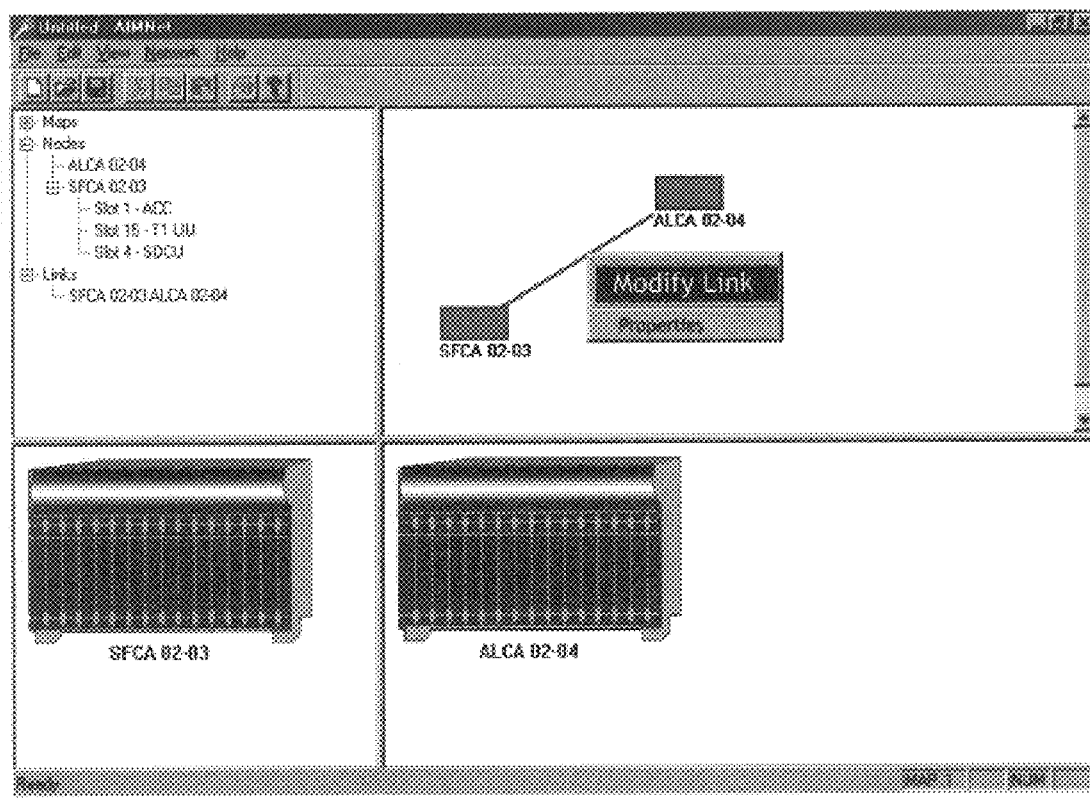

With regard to FIG. 7, a typical line card 31B–31D provides a network interface through the backplane connectors, and protection circuits provide the communications paths to the network interface to prevent harm to the system in the event of foreign voltage being induced on the telecommunications network circuits. A signal recovery and transmission circuit (full duplex), in this example a T-1 framer, converts network telecommunications signals into digital signals compatible with the card's logic circuits. Data to/from the network is then routed through the card using a series of multiplexer (mux) devices and buffers to mapping circuitry, which distributes the digital signals in properly time format to the system bus interface, which is provided physically by the midplane connectors of the line card. The system bus then distributes the data payload to the other feature cards of the system, from which the data may be transmitted outbound in accordance with a predetermined system wide map. Signaling information is managed separately from data payloads using s/p converters and dedicated routing circuitry. Test functions, such as Bit Error Rate Tests (BERT) are implemented in separate dedicated circuitry. Data is switched to/from the BERT circuits using multiplexer (mux) circuits. Other feature cards, as described below, are substantially similar to the T-1 line card described and depicted in FIG. 7.

Thus each feature card is entirely responsible for all of the data handling functions described above and is relatively autonomous within the overall system. This distributed processing, loosely coupled architecture enables the system to be highly reliable by removing critical interdependencies.

Figures 5, 6, 7, 8:
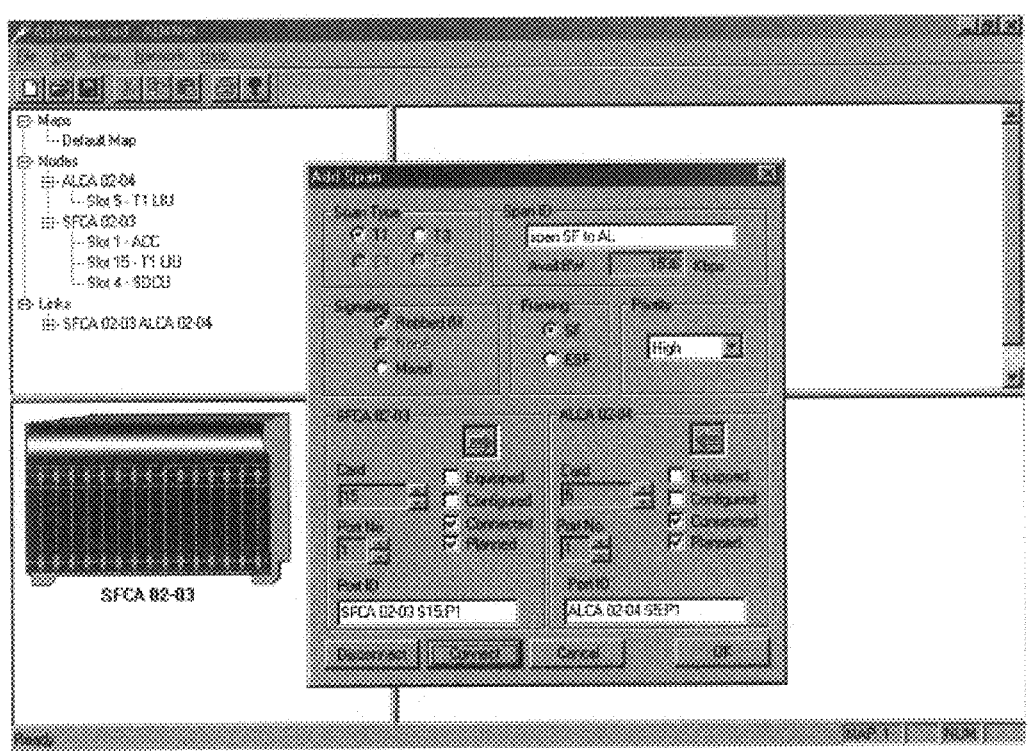

The system of the invention may also carry out channel bank function, as depicted in FIG. 8. In channel bank operation analog sources and other signals from one location are accepted into the intelligent multiplexer system by at least one access card. As shown, such access feature cards may include a Quad Synchronous Data Channel Unit (QSDCU) card, 10base-T Local Area Network (10-T LAN) card, or Foreign Exchange (FXO) card. The input signals are converted by these feature cards into digital signals having the proper speeds and formats compatible with the system, and are conducted to a line card, such as a T1 card described previously. The T1 has an interface compatible with tariffed services offered by public carriers, indicated here generally as a public network. At the far end of the public network the data is received by a T1 line card and distributed to the companion feature cards. The feature cards convert the incoming telecommunications signals into signals that are compatible with the premises equipment or system at the destination.

In the preferred embodiment up to 32 controller cards, line cards and feature cards may be installed in the reconfigurable intelligent multiplexer system. A plurality of multiplexer systems are deployed, each at one node of a telecommunications system. In a fully configured form, each system provides a maximum system capacity of 64 Mbps, which accommodates 1,020 DS-0s, 124 T1 lines, or multiple T3 lines. Likewise, the system is equally adept at handling E1 spans, which carry 30 DS-0s and have a bandwidth of 2 Mbps, as well as multiple E3 lines.

Figures 5, 6, 7, 8, 9:
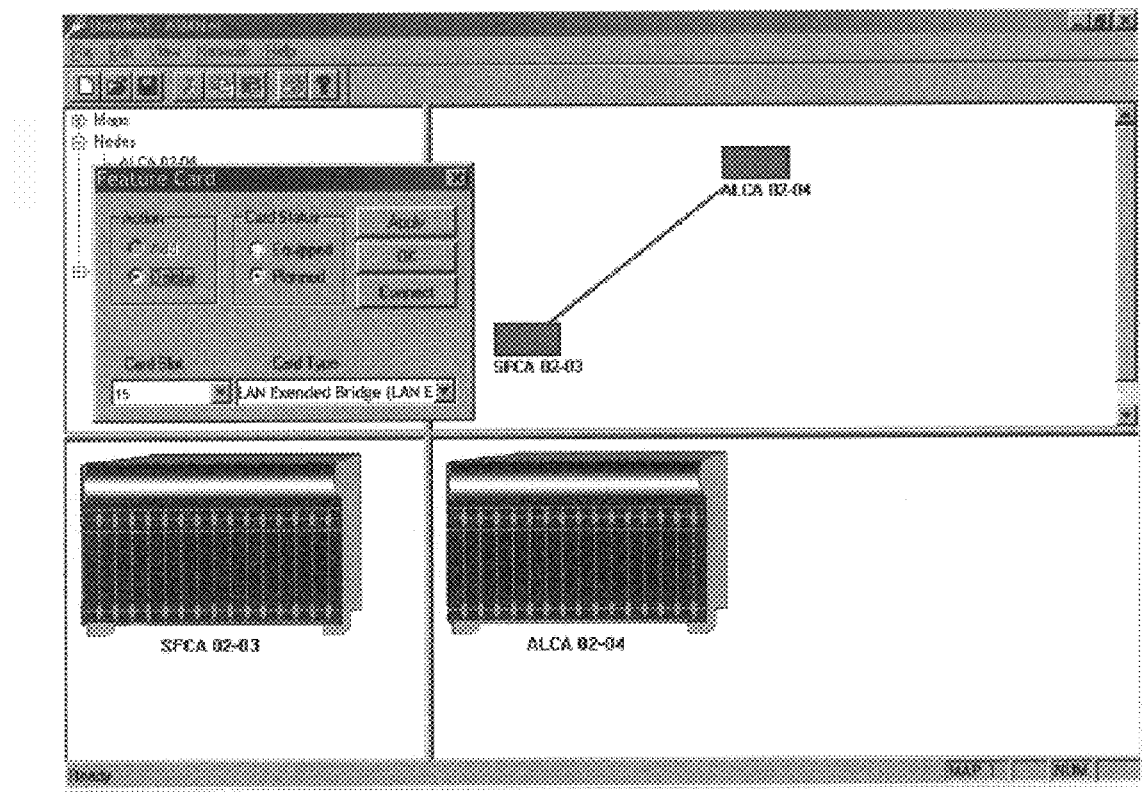

With regard to FIG. 9, the reconfigurable intelligent multiplexer of the invention may be configured as an M13 multiplexer. In this configuration, a node of the system connects a plurality of DS-1 circuits (T1 lines) to the DS-3 level (T3 line). The node operates to consolidate multiple T1 circuits to/from the communications node or to/from LAN/WAN connections. In addition, the system can be used to groom and consolidate DS-0 channels on T1 circuits coming from system nodes into a smaller number of T1 s or into a T3 line communicating with another system node.

Figures 5, 6, 7, 8, 9, 10:
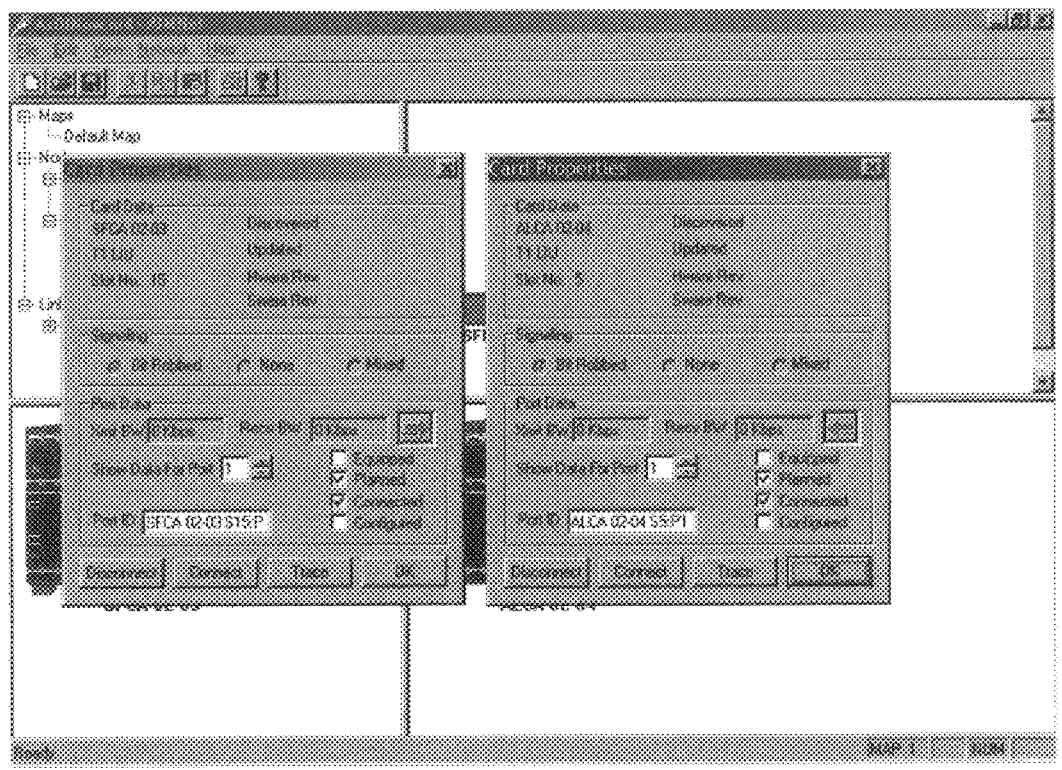

In addition, the system of the invention can operate in a digital cross-connect mode, as shown in FIG. 10. In this mode of operation, a node can operate on T1 circuits to groom individual DS-0s, DS-1s, or DS-3s, as described above. In addition, the node can establish connections in point-to-point fashion among the lines joined to the node, so that the node can set up 56 kbps or 64 kbps voice connections, or n×56 kbps or n×64 kbps data connections among the equipment connected to a single node.

A significant aspect of the invention is the provision of a software control package for the user to enable the establishment of communications nodes, wherein each node is equipped with one reconfigurable intelligent multiplexer, and to establish the communications paths between and among the nodes, as well as the management of the system defined thereby. With reference to FIG. 6, the user control arrangement includes three primary components: the network comprised of the nodes and interconnections, a software shell, and a graphical user interface (GUI) that is displayed on a desktop computer, workstation, or other computer system that provides a graphic display and enables user input through manual means such as a mouse, trackball, touchscreen, verbal commands, or keyed commands, or any combination thereof. It is also significant that the network may be under design, or may be in existence and in operation, so that the tasks of creation, management, and modification of a network may all be carried out by the software shell.

The software shell provides a view manager that creates the display screens of the graphical user interface. The view manager offers three different views of a network: tree view, net view, or node view. The tree view is a tree-like listing of all of the entities (e.g., nodes, spans, cards) in the network. The net view is a graphical representation of the nodes and their associated links, as shown in FIG. 6. The node view is a detailed graphic of an individual node, showing the card equipment as it actually appears in a node. Using the graphical interface, a user may designate nodes, establish spans between nodes, choose cards, ports, and features for each node, and define the circuit links that comprise each span. The view manager passes this data to the design manager module, which uses that data to build routes with the correct number of channels, cards and signaling and store the this information as the network design. This network design information is automatically downloaded to the nodes by a software shell communications manager. Network configuration and routing information can be uploaded to a commercial database such as Oracle™, Access™, or Informix™ via the data exporter module of the software shell.

An example of network design is illustrated by the screen shots of FIGS. 5-1 to 5-12. As shown in FIG. 5-1, the basic screen display of the GUI is a split-window design having four quadrants that are individually scrollable and resizable. The upper left quadrant is a resource tree, listing all network resources used in the design. The resource tree acts as a quick reference for network data. The upper right quadrant is a functional block diagram view of the network, with nodes displayed rectangles and links between nodes displayed as heavy lines. The user can add or remove nodes and links, or rearrange them, and change the properties of the links by standard GUI click-and-drag techniques that are well known in the prior art. The lower left and right quadrants are graphic representations of nodes, the nodes displayed being selected by mouse-clicking on any node in the network view. (Note that the identity of the nodes in the lower quadrants corresponds with the nodes portrayed in network view.) In the node views, users may select any feature card to be installed or removed from the multiplexer 21 that forms the node, and may determine the cards properties and the routing configuration for each port on the card.

Figure 2:
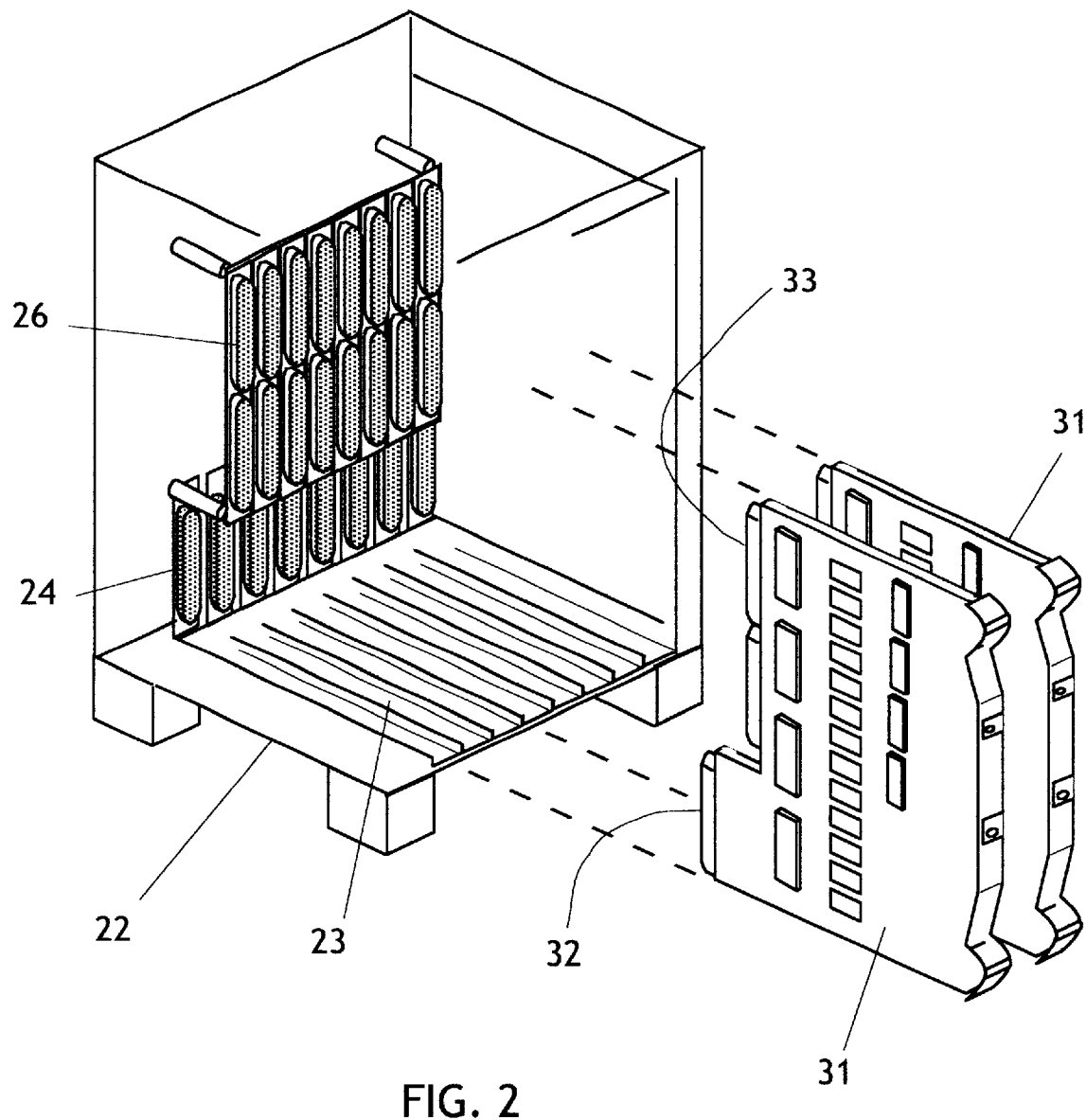
FIG. 2 is a exploded cutaway perspective view of the reconfigurable intelligent multiplexer depicted in FIG. 1.

With reference to FIG. 5-2, to initiate a network design, the user first selects the Edit pulldown menu, and chooses the Insert dialog box. From this dialog box, the user can select as item type either a node or a link. Each node and link must be given a unique name for inventory management and an IP address for network management, as shown in FIG. 5-2. After the dialog box is closed, using the OK button, this process may be reiterated to define a plurality of nodes for the planned network.

With reference to FIG. 5-3, the screen display indicates that two nodes have been inserted and named: ALCA and SFCA. The Edit pulldown menu may be selected once again and the Insert dialog box may be used to choose a link between the defined nodes, and a unique name is ascribed to the link. The link, which is a logical pathway, may be drawn between the nodes in the network view. Although the example in this Figure is a simple point-to-point network, other configurations such as Y connections (or, logically, star connections) and plural nodes linked serially in linear array or ring array are also possible.

As shown in FIG. 5-4, a third node (SJCA) has been added, and the three nodes have been linked in a ring configuration. Nodes and links may be dragged and dropped on-screen and rearranged as desired, and the links will follow the nodes as if they are rubber bands. Note the Tree view showing the nodes and paths that have been placed in the Network view. Note also that the quadrants have been resized to visualize all the nodes in Network view.

Once the network topology has been laid out by specifying nodes and links, the next step, shown in FIG. 5-5, is to add spans, which are the actual telecommunications circuits that form the links. Spans generally include T1 and T3 circuits. Before adding the spans, it is necessary to add the appropriate line interface cards to the nodes. This is accomplished by selecting the node in the network view with the mouse, causing a pop-up context menu to appear which allows the user to draw the node in the lower left or right quadrant, as indicated in the Figure.

With regard to FIG. 5-6, once the nodes are depicted in the node views, the line interface units can be added to enable span interconnections. The Feature Card dialog box is available from the pulldown Edit menu, and is used to specify the required cards. In the Feature Card dialog box, the user may specify type of card (here, T1 line interface card) and the slot number the card will occupy in the node selected. Furthermore, note that the user may specify whether the procedure involves adding, deleting, or changing the card, and further specifies whether the card has been previously specified in a node (Equipped) or is being planned for the node.

The actual cards do not need to be in place to perform the network design. The design manager of the software shell marks the cards as planned and reserves the card slots in their respective nodes. The design manager also requires configuring the node for the cards before it will allow spans to be designated. This requirement forms one check performed by the system to maintain consistent and reliable network design. Thereafter, as shown in FIG. 5-7, spans are added to the network design by using the mouse to select the desired link to evoke a pop-up context menu which enables modifying the link or specifying its properties.

As shown in FIG. 5-8, upon selecting the Modify Link option of the context menu, an Add Span dialog box appears which enables the user first to select the type of span desired to be added. This action causes the design manager to search both the source and destination nodes of the span for compatible line interface units, and then displays the first compatible line interface card it finds as well as the card's relevant data, including slot number, port number, and available bandwidth. The dialog box also provides up/down arrows adjacent to the card number and port number windows, so that the user may navigate through the ports on the card, or through the cards installed or planned for the node. The broad arrows disposed to the right of each node identification number are displayed in changeable color: yellow indicates that a connection is possible at the bandwidth indicated; red indicates a connection is not possible because the respective port is already interconnected on another span; and green indicates that the two ports indicated by their numbers are already connected on the span. To complete a connection, the user navigates through the recommended ports and cards until yellow arrows are show for the ports identified in the number window. To connect the ports using the span, the user may either click on the Connect button of the dialog box or on the yellow arrow. To disconnect two ports, the user navigates through the port numbers to select the desired port numbers (both arrow displays will be illuminated green) and clicks on the Disconnect button.

After the node interconnections are fully defined, the user may add the appropriate access cards to each node to enable connection of the telecommunications equipment at each node. With reference to FIG. 5-9, the user accesses the Feature Card dialog box from the pulldown Edit menu, and scrolls through the choices available in the Card Type display of the dialog box. As an example in this Figure, a LAN Extended Bridge card has been chosen for the SFCA node. The process of adding, deleting, or changing feature cards follows a similar pattern.

To establish a connection between two ports of two feature cards, the user selects the Connect button of the Feature Card dialog box. This action caused the Card Properties dialog box to appear, and these dialog boxes for both cards are evoked, as shown in FIG. 5-10. These cards display all relevant card data, including transmit and receive bandwidth, route map information, port number and ID, and the like. Once again, broad arrows of variable color are displayed to indicate the availability of the ports: : yellow indicates that a connection is possible at the bandwidth indicated; red indicates a connection is not possible; and green indicates that the two ports are already connected.

Once the indicated ports are selected for connection, either by clicking on the broad yellow arrow display or on the Connect button, another dialog box titled Confirm Trunk Connection is evoked and overlaid on the Card Properties dialog boxes, as shown in FIG. 5-11. The Confirm Trunk Connection dialog box permits the user to scroll through and select from all available network spans, using the Next Choice button. The user may select the bandwidth desired, using the up/down arrow control adjacent to the Bandwidth displays. Once the connection is set up, the user clicks on the Confirm button, and the Confirm Trunk Connection box disappears. The underlying Card Properties dialog boxes (FIG. 10) then indicates the completed connections by displaying green broad arrows.

The screen displays of FIGS. 5-1 to 5-11 may be used reiteratively to fully lay out and configure a network design, or to modify an existing design, or to examine an existing network. The Design Manager of the Software Shell (FIG. 6) assembles and translates all the detailed data regarding node configuration and span connections into a network map. The map is stored by the central controller and may be referenced via SNMP, and may also be transmitted to the nodes if they are preexisting, or to the planned nodes as they are constructed. The translation and transmission of the network map is accomplished using a combination of User Datagram Protocol (UDP) and Transmission Control Protocol (TCP) signaling.

Different maps may be accessed by using the View pulldown menu and selecting a Map menu item thereunder, invoking a Network Map dialog box, as shown in FIG. 5-12. This dialog box enables the user to select Map Number, Map Type, and default setting (Reroute on Resource Failure). In addition, the dialog box provides a Schedules block that enables the user to select the days and times that the map is loaded and unloaded, and to change, delete or find another schedule. For example, as shown, a weekend mapping routing may be loaded for non-business weekend hours (Friday evening to Monday morning). Other maps that alter the node connection scheme may be loaded as required. For example, heavy digital network traffic may require a remapping of the system, or heavy video traffic may require special mapping schemes.

The user may also employ the GUI to update individual nodes, through the mechanism of a Node Configuration dialog box that is invoked using the Network pulldown menu. The user may select the node(s) to be modified in the left-most column. The date and time of the last configuration update is indicated in the third column. The Discovered column lists the first date the node was contacted by the Software Shell. When the user selects the Update button of this dialog box, the node is contacted and every slot is queried to determine the type of card present, the hardware revision, software revision, and serial number of the card. This data is transferred to the Design Manager and stored in the archive file of the Data Base. Thereafter, the node may be polled, as described in the foregoing, to examine and possibly change the configuration of the node.

With reference to FIG. 5-14, in a similar fashion the Routing Updates dialog box may be accessed to determine the card/port routing configuration of any node. Nonvolatile copies of the routing tables and map information are stored in nonvolatile memory at the nodes and may thus be retained even in the event of complete power failure.

As shown in FIG. 5-15, a Routing Grid dialog box may also be invoked under the Network pulldown menu. This dialog box provides a list of every card and associated port number and name, correlated with channel number, transmit slot and bus number, receive slot and bus number. Thus all routing information may be examined when required.

The data generated from these dialog boxes (FIGS. 5-12 to 5-15) is managed using a Microsoft Windows™ archiving feature; that is, the same mechanism used by other Windows™ applications such as MS Word™. Data may also be exported to any ODBC-compliant database such as Oracle™, Sybase™, MS Access™, or MS SOL™.

The screen shots of FIG. 5 do not comprise an exhaustive illustration of all the windows and control options available to a user of the GUI of the invention. The screen shots shown are presented to depict the significant control features of the Software Shell that enable the user to perform all the necessary tasks involved in layout, design, configuration, and connection of the node hardware, starting from a broad conceptual view of nodes and links and proceeding to a detailed scheme of card selection, and card/port connections. Moreover, the same Software Shell may be employed after the planning stage to interact with the existing node hardware of a network, to reconfigure the nodes, remap the node connections, or add or remove nodes, feature cards, line cards, or spans between nodes.

Figures 5, 6, 7, 8, 9, 10, 11:
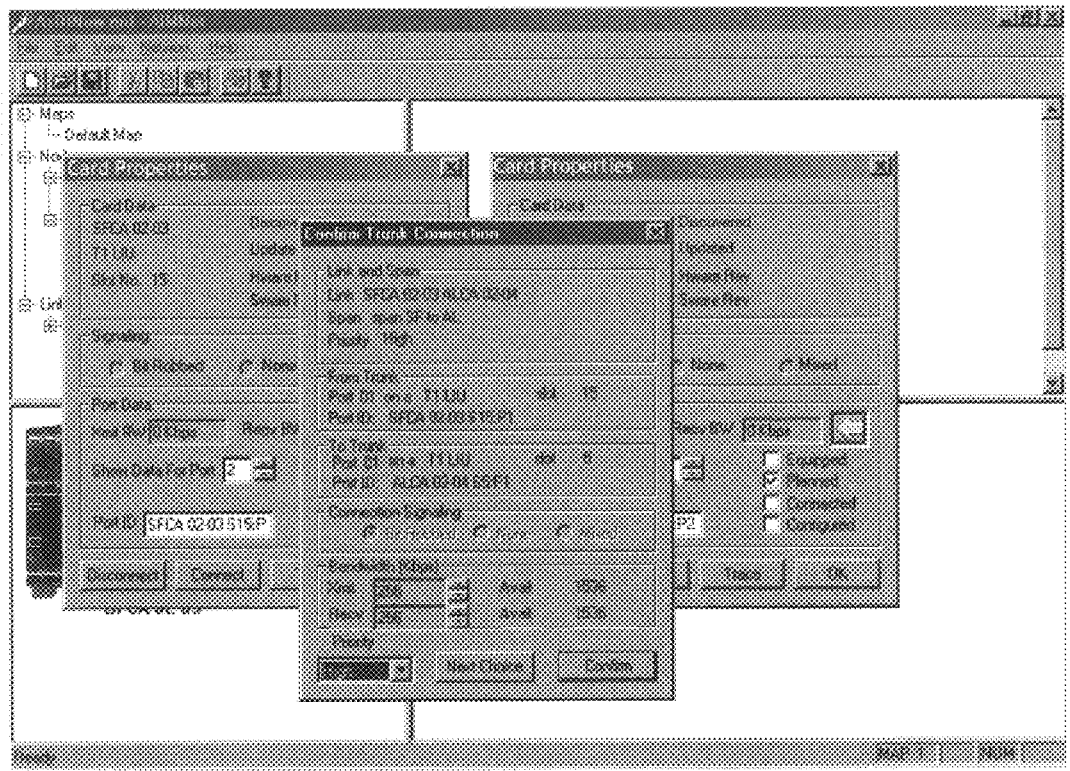

The AIMNET software shell may also be used to provide a large measure of fault tolerance to a network, whereby the network may be substantially robust and capable of dealing with both span failure and component failure. To accommodate the potential for span failure, a network may be constructed in accordance with the invention as shown in FIG. 11. As an example, nodes 1, 2, and 3 are connected in a ring configuration, each node comprising a shelf unit 22 as described previously. Nodes 1 and 2 are connected by spans A and B, nodes 2 and 3 are connected by spans E and F, and nodes 1 and 3 are connected by spans c and d. Connected to each node are user groups passing traffic across the network. These users generate a combination of voice and data traffic that are, in general, channel sources and sinks $T_n$-$T_m$. These channels are assigned one of three levels of priority $P_1$, $P_2$, and $P_3$, where $P_1$ is the highest priority. A primary route is required for each traffic source; that is the route used under non-failure conditions. Up to two alternate routes maybe designated for each traffic source, the alternate routes to be used in the event of failure of the specified primary route, in accordance with the assigned channel priority.

During normal operation sufficient bandwidth exists for all user groups to be routed according to a set routing plan using primary routes. A default routing plan is created by the network operator specifying all channels and routes for all traffic. As described above, the AIMNET software monitors network resources during routing design and will not allow the user to submit a design that cannot be implemented because of resource or design limitations. During a span failure one or more of the spans A–F become unavailable. Span failures and restorations are treated as triggering events. As these events occur AIMNET routes traffic based upon the state of the network after the event has occurred, without regard to the order of failure of spans. All traffic is grouped as shown in the three tables below, based on the assigned channel priority. In the example traffic $T_0$-$T_{23}$ between node 1 and node 2 is normally routed on span A, channels $A_0$-$A_{23}$, respectively. Traffic $T_{24}$-$T_{47}$ is normally routed on span B, channels $B_0$-$B_{23}$.

TABLE 1

Priority 1 Traffic

| Routes | $T_0$-$T_9$ | $T_{24}$-$T_{33}$ |
| --- | --- | --- |
| Primary Route | $A_0$-$A_9$ | $B_0$-$B_9$ |
| First Alternate | $B_{10}$-$B_{19}$ | $A_{10}$-$A_{19}$ |
| Second Alternate | — | — |

TABLE 2

Priority 2 Traffic

| Routes | $T_{10}$-$T_{13}$ | $T_{34}$-$T_{37}$ |
| --- | --- | --- |
| Primary Route | $A_{10}$-$A_{13}$ | $B_{10}$-$B_{13}$ |
| First Alternate | $B_{20}$-$B_{23}$ | $A_{20}$-$A_{23}$ |
| Second Alternate | — | — |

TABLE 3

Priority 3 Traffic

| Routes | $T_{14}$-$T_{23}$ | $T_{38}$-$T_{47}$ |
| --- | --- | --- |
| Primary Route | $A_{14}$-$A_{23}$ | $B_{14}$-$B_{23}$ |
| First Alternate | — | — |
| Second Alternate | — | — |

In the event of a failure of span A of FIG. 11, traffic $T_0-T_9$ is rerouted from $A_0-A_9$ to $B_{10}-B_{19}$, as shown in Table 1, because the priority 1 traffic must be satisfied before other priorities are considered. Traffic $T_{10}-T_{13}$, which is priority 2 traffic, is rerouted from $A_{10}-A_{13}$ to $B_{20}-B_{23}$, as shown in Table 2. Traffic $T_{34}-T_{37}$ is displaced on the primary route $B_{10}-B_{13}$ by $T_0-T_3$, and cannot be rerouted to the second choice of $A_{20}-A_{23}$ because the span is unavailable. Traffic $T_{14}-T_{23}$ fails because no secondary route is specified and traffic $T_{38}-T_{47}$ is displaced by traffic $T_4-T_{13}$. Thus priority traffic is salvaged and lower priority traffic is sacrificed, and the network continues to operate.

In this example two dimensions of priority assignment are demonstrated: explicit priority and implicit priority. Explicit priority is obtained by assigning traffic priority values of $P_1$, $P_2$, and $P_3$. All traffic of higher priority is routed first before lower priority values are considered. Implicit priority is set by placement of a traffic type inca table. In the example above $T_{34}-T_{37}$ have the same priority as $T_{10}-T_{13}$ but do not survive the failure of span A. Because the algorithm must have a search priority, routes placed in the beginning of the table have an advantage and may use routes listed for other traffic in the same table.

The example of FIG. 11 can be expanded by reserving four channels $C_0-C_3$ and setting them up as a tandem route on node 3, via $E_0-E_3$. The revised tables then appear as shown below:

TABLE 4

Priority 1 Traffic

| Routes | $T_0-T_9$ | $T_{24}-T_{33}$ |
|---|---|---|
| Primary Route | $A_0-A_9$ | $B_0-B_9$ |
| First Alternate | $B_{10}-B_{19}$ | $A_{10}-A_{19}$ |
| Second Alternate | $C_0-C_1/E_0-E_1$ | $C_2-C_3/E_2-E_3$ |

TABLE 5

Priority 2 Traffic

| Routes | $T_{10}-T_{13}$ | $T_{14}-T_{37}$ |
|---|---|---|
| Primary Route | $A_{10}-A_{13}$ | $B_{10}-B_{13}$ |
| First Alternate | $B_{20}-B_{23}$ | $A_{20}-A_{23}$ |
| Second Alternate | $C_0-C_3/E_0-E_3$ | $C_2-C_3/E_0-E_3$ |

Priority 3 Traffic remains unchanged. The tertiary route $C_0-C_3/E_0-E_3$ is reserved to carry mission-critical traffic, which is normally assigned to routes A ($T_0-T_1$) and B ($T_{24}-T_{25}$), and no traffic from node 2 is assigned to this route. If both spans A and B fail, the mission-critical traffic will survive via the tertiary route. Note that node 2 has no knowledge of the rerouting event and is strictly passive. As a side benefit $T_{34}-T_{37}$ can use the tandem route when span A fails and $T_{10}-T_{13}$ can use the tandem route when span B fails.

The priority routing scheme is an option that may be implemented in the AIMNET Manager. A conformal data base is constructed by the Manager and transmitted to the central controller(s) of each node using FIP. Connections are given a sequential number associated with them from 0–n, where n is less than 8000. The central controller will process those connections according to the associated priority number.

Figures 5, 6, 7, 8, 9, 10, 11, 12:
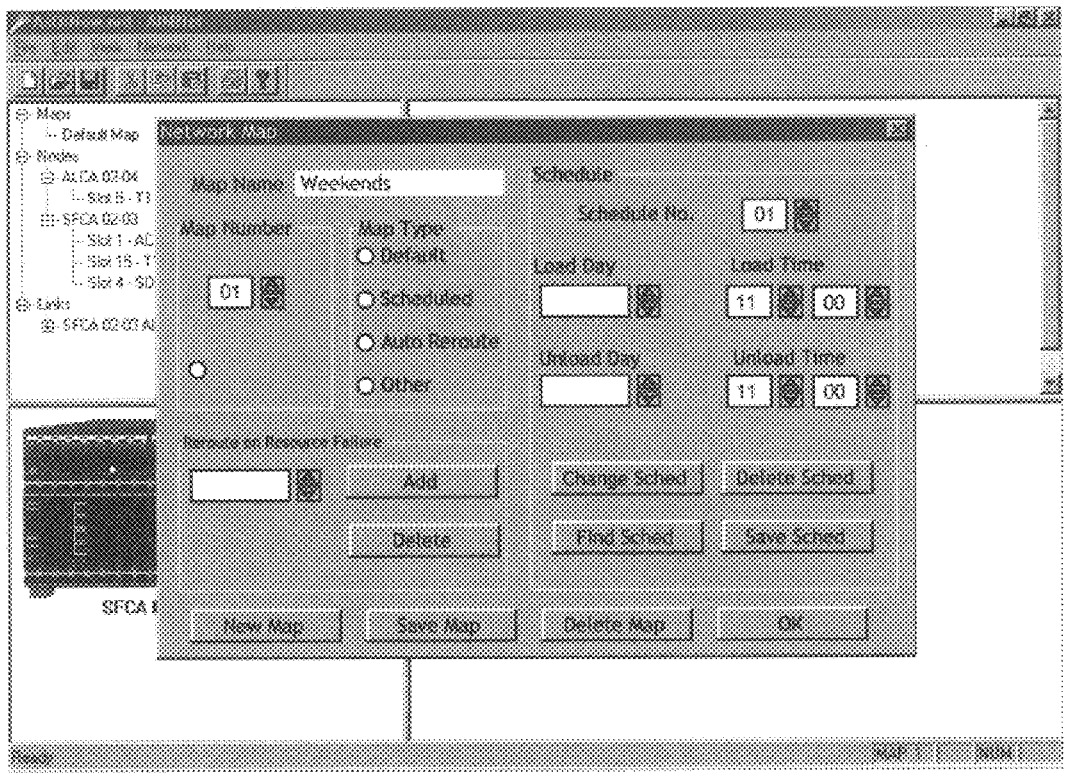

To accommodate the potential for node failure, the system provides the option of constructing each node in a redundant configuration, as shown in FIG. 12. A node may be provided with two coupled shelf units 21a and 21b, each having dual power supplies and fan assemblies. In addition, dual central controller cards (ACC) are installed. This arrangement can be configured as either a single shelf serving up to fourteen feature cards, or a dual shelf system serving up to thirty feature cards. When configured as a duplex dual shelf system each shelf is independently powered and cooled by duplex power supplies and fan assemblies. However, only one set of ACC cards is needed for the two-shelf system. One ACC card is designated as primary and must occupy slot 0 of shelf 21a and the second ACC card can occupy any other slot other than slot 0 of shelf 21b. Dual power feeds, either 110 VAC (ACA, ACB), or −48 VDC (DCA, DCB) can be used to provide power to the system. DC and AC feeds cannot be mixed on the same system, nor can power be fed from one shelf unit to the other. The node shown in FIG. 12 for example only is equipped to connect a plurality of T-1 lines and other traffic and transmit along a T3 (or E3) span.

In this redundant arrangement, each subsystem, such as power supply, is independent of the other subsystems. For example, in the event that one power supply fails, both fan assemblies will continue to operate. The only exception to this rule regards power feeds and power supplies: power feeds DCA and DCB, or ACA andf ACB are dedicated to the supplies they feed and are not cross-wired. For example, if either power supply DCA or ACA fails, the power supply connected thereto will cease operation, but the other power supply continues to operate, and the system can function normally with one power supply. The primary central controller ACC card monitors all voltages of both power supplies and reports a failure via an alarm trap. Likewise, a failure of a power supply will not cause service interruption. Other mechanical systems failures, such as the cessation of one fan assembly, will not stop operation of the unit, although the system temperature may rise beyond normal specifications, depending upon the configuration of the system. Elevated temperatures do not pose an immediate service jeopardy, but should be corrected as soon as possible, due to the fact that elevated temperatures cause premature aging of the electronic components. Excessive temperature is reported by the primary ACC as an alarm trap.

Regarding the failure of electronic components, the dual ACC arrangement permits one ACC card to be a primary operational device, and the other is reserved in standby. If the active ACC card fails, errors may occur for transient events and access may be delayed until the standby ACC card has fully switched to the active mode. In the event of an ACC card failure the standby ACC card will report an unexpected mate switch and initialization as part of the changeover process, via an alarm trap.

Figures 5, 6, 7, 8, 9, 10, 11, 12, 13:
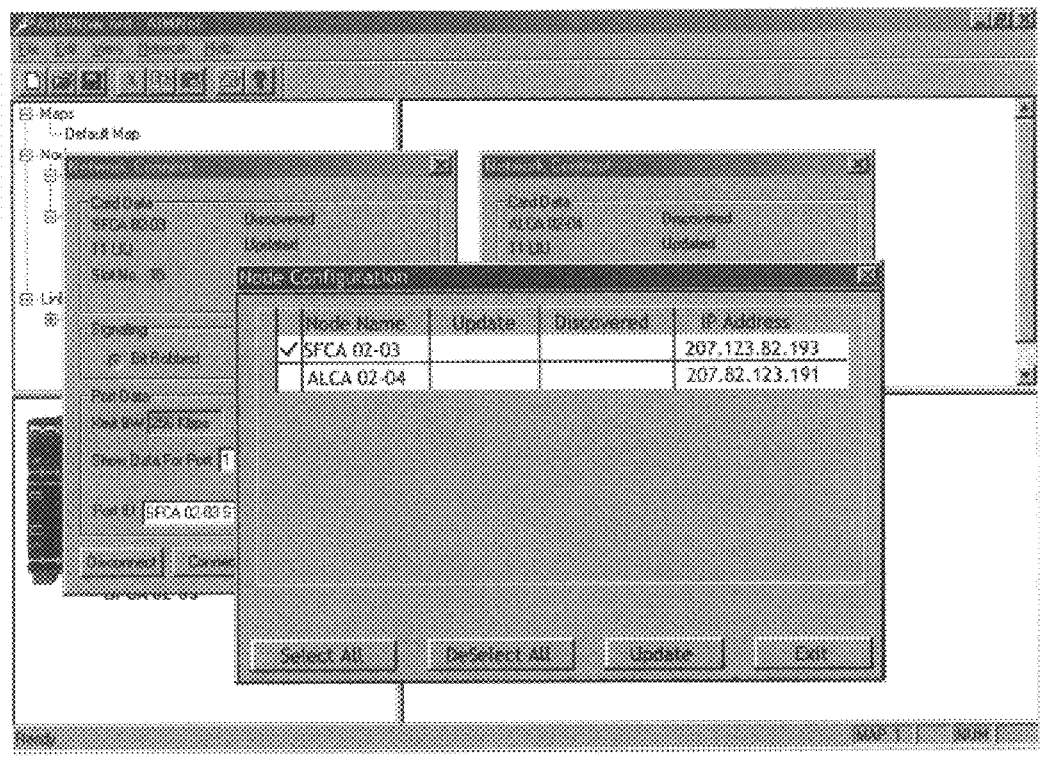

With regard to FIG. 13, a node may be configured in fully redundant mode using two shelf units 21c and 21d to perform as a M13 multiplexer, as described with reference to FIG. 9. A single T-3 span terminates on two T-3 LIUs (Line Interface Units), one LIU being designated as active and the other being a standby. In the event the active LIU fails, the primary ACC card detects the failure, activates the standby LIU, and remaps all circuits to the newly activated unit. Service is affected only briefly during changeover. Other electronic component redundancies provided, such as the dualACC cards and dual T-1 cards in each unit, are arranged in similar active/standby pairs to prevent node failure.

Figures 5, 6, 7, 8, 9, 10, 11, 12, 13, 14:
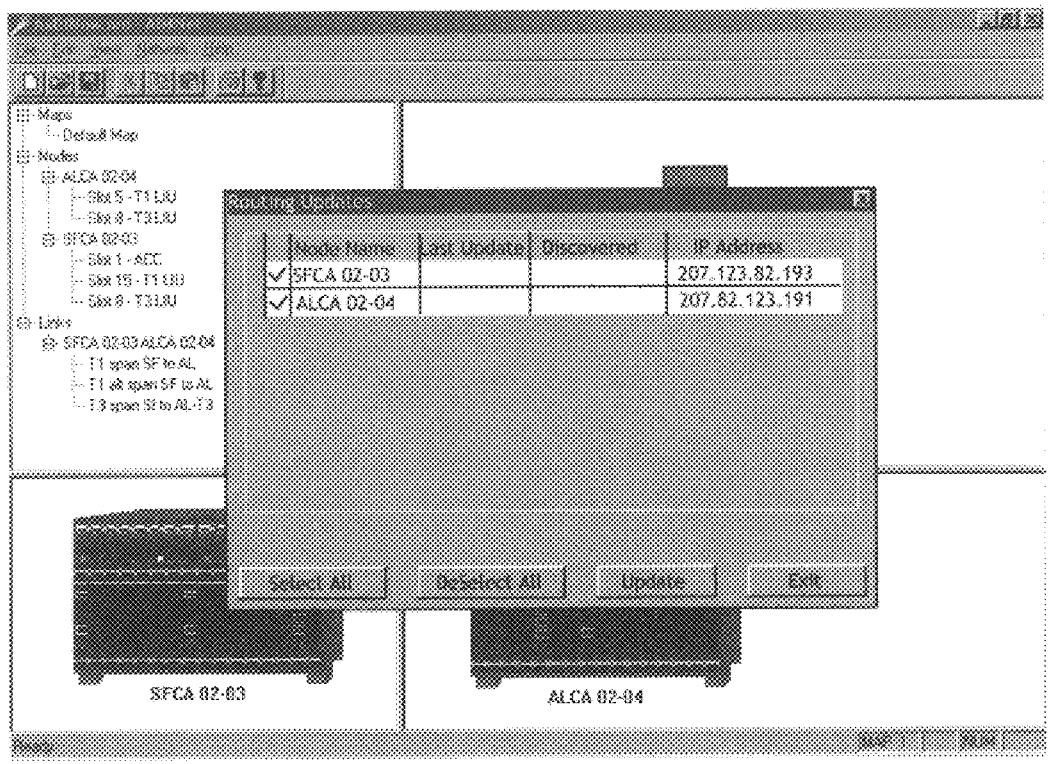

With regard to FIG. 14, a contrasting minimal arrangement for an M13 node is a simplex system in which two shelf units 21e and 21f are coupled to serve as the node, with each shelf unit having a single power supply and dual fan assemblies (there is no savings realized in using one fan assembly). In this configuration a failure of either a power supply, power feed, or ACC card will cause a complete system failure. However, this minimal configuration provides the requisite service at the lowest possible cost.

Figures 5, 6, 7, 8, 9, 10, 11, 12, 13, 14, 15:
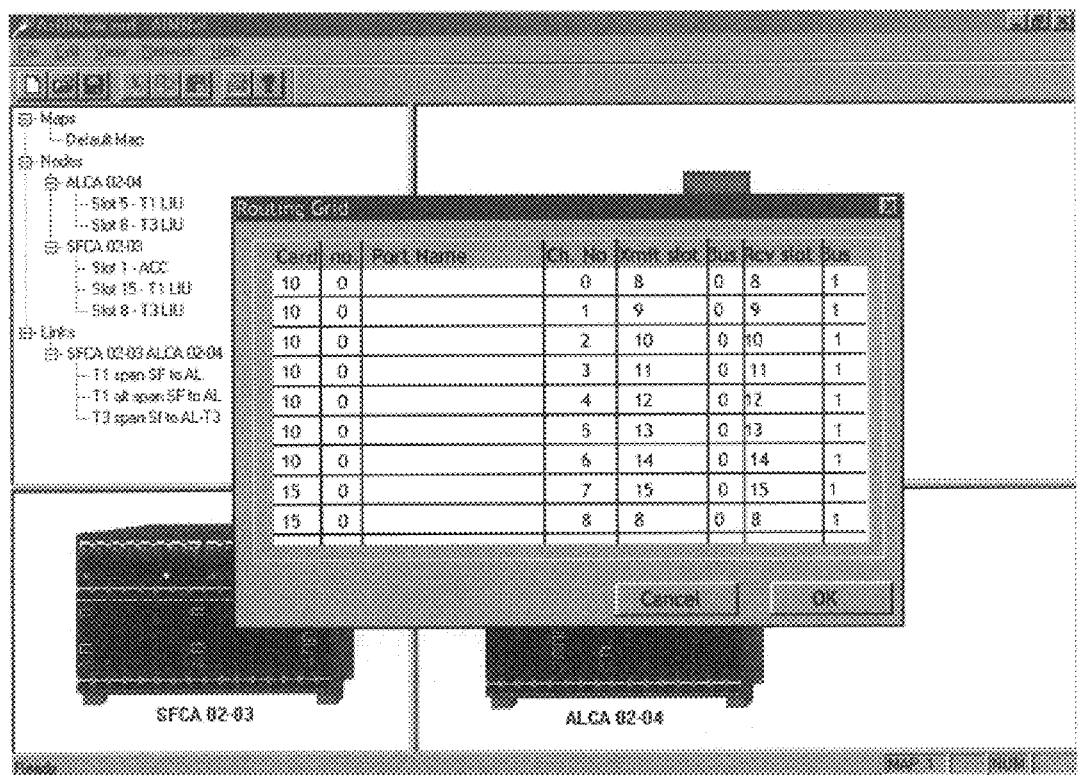
Figure 6:
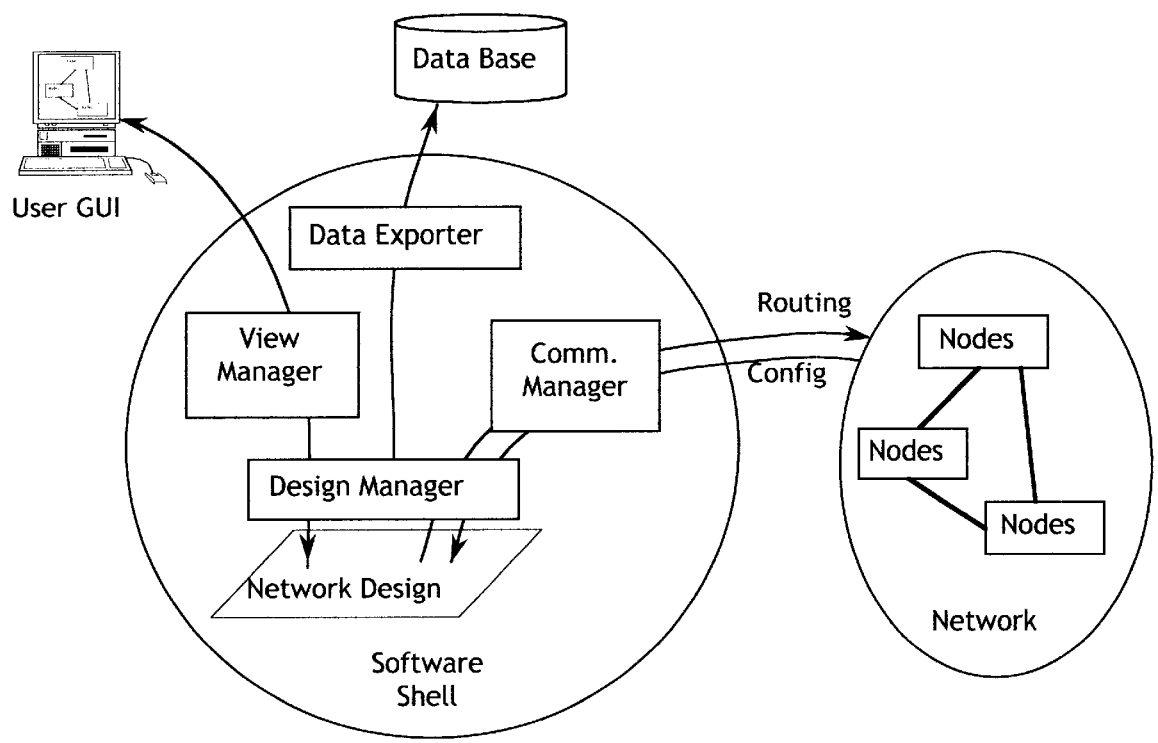
Figure 7:
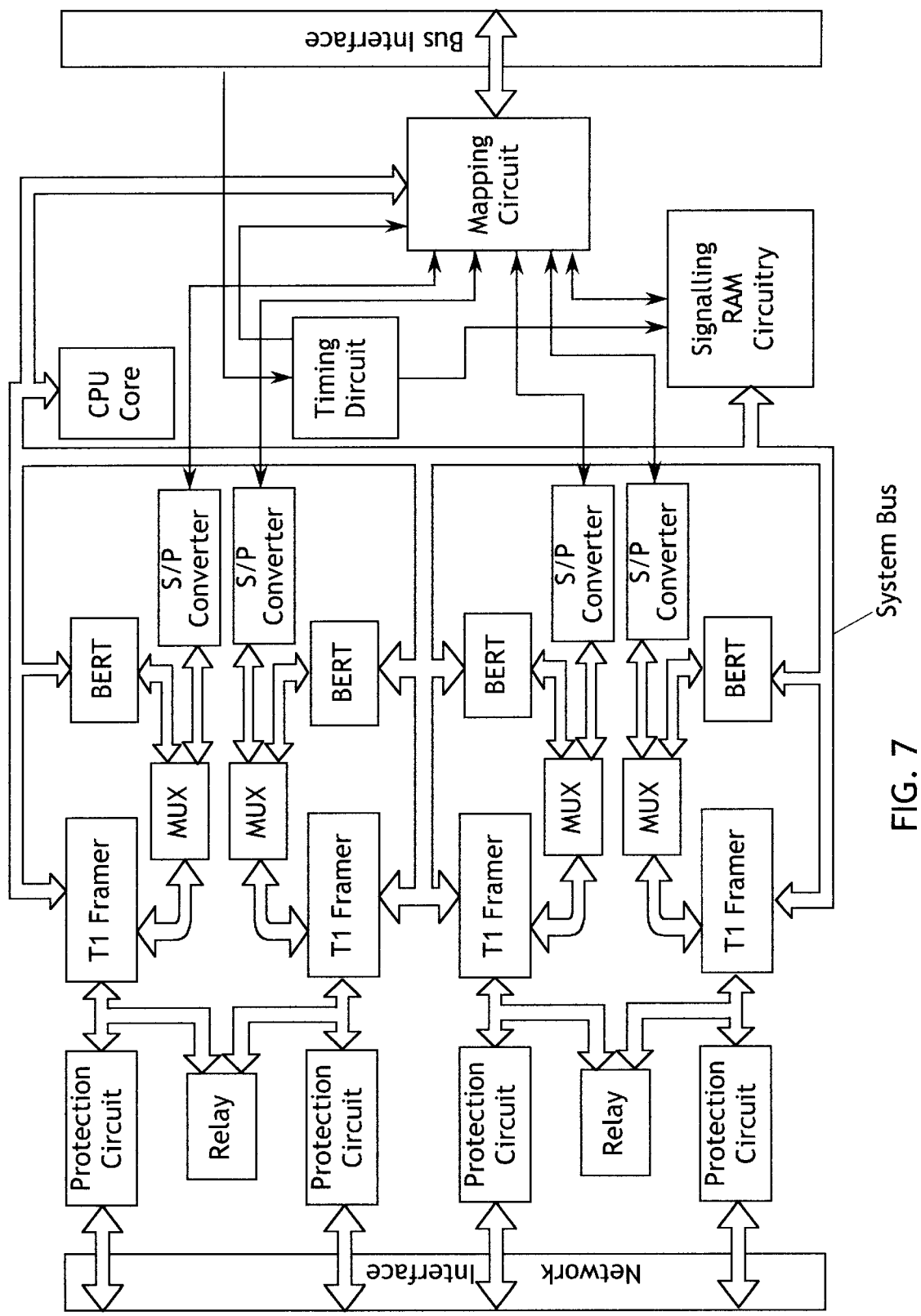
Figure 8:
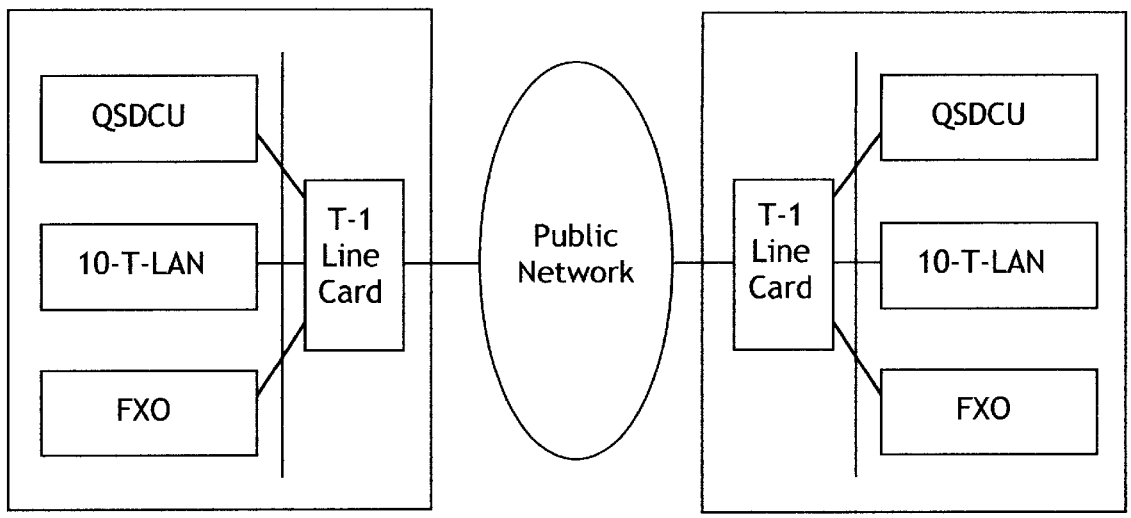
Figure 9:
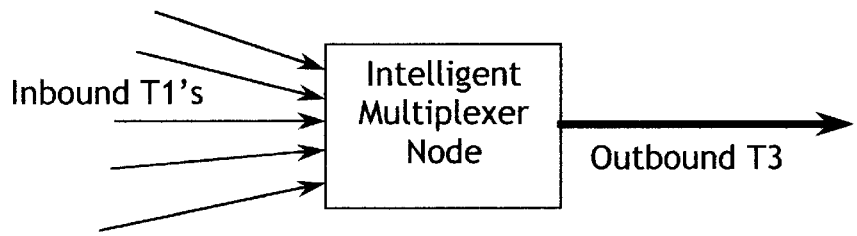
Figure 10:
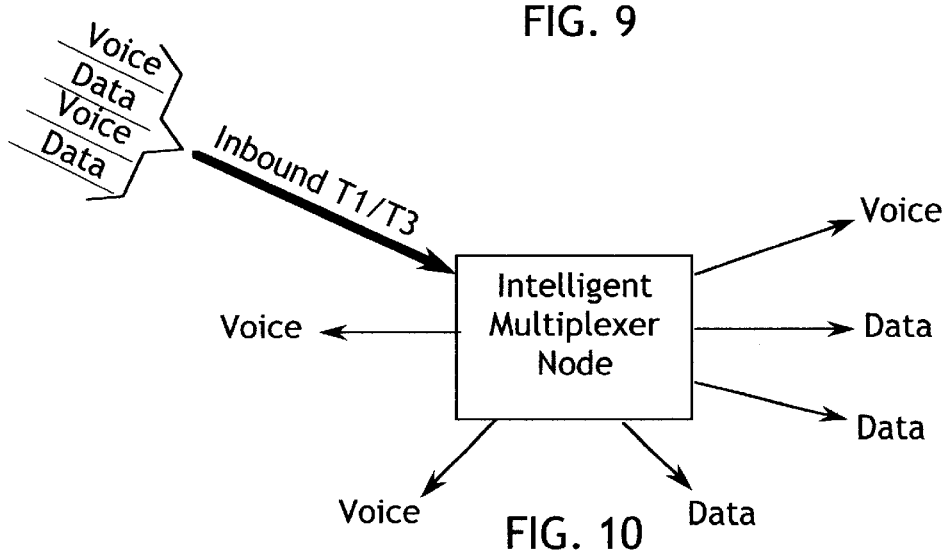
Figure 11:
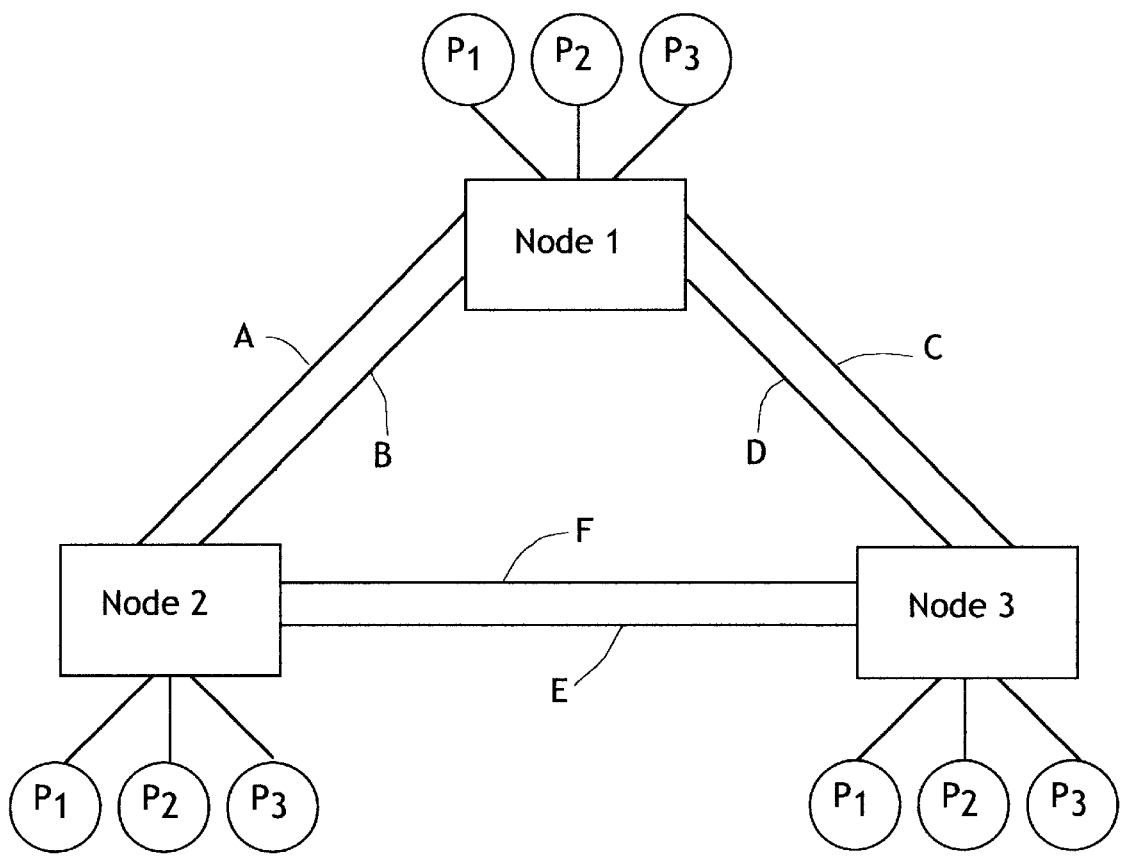

With regard to FIG. 15, the components described above may be combined to create a high bandwidth D/I Mux (drop-and-insert multiplexer) hub for a transmission network. A shelf unit 21g is provided with dual power supplies and fan assemblies, and dual ACC central controller cards in fully redundant fashion. In addition, a synchronous data channel unit card (SDCU), a T-1 line interface card, and a T-3 LIU are installed. Subtending D/I Mux systems 61 and 62 are connected to the unit 21g via T-1 spans 63 and 64, whereby the unit 21g acts as a T-1 concentrator, collecting T-1 spans from the subtending systems 61 and 62 and multiplexing their spans onto a T-3 span for network connectivity. This arrangement is cost-effective when the number of T-1 spans being used exceeds approximately eight.

Figure 16:
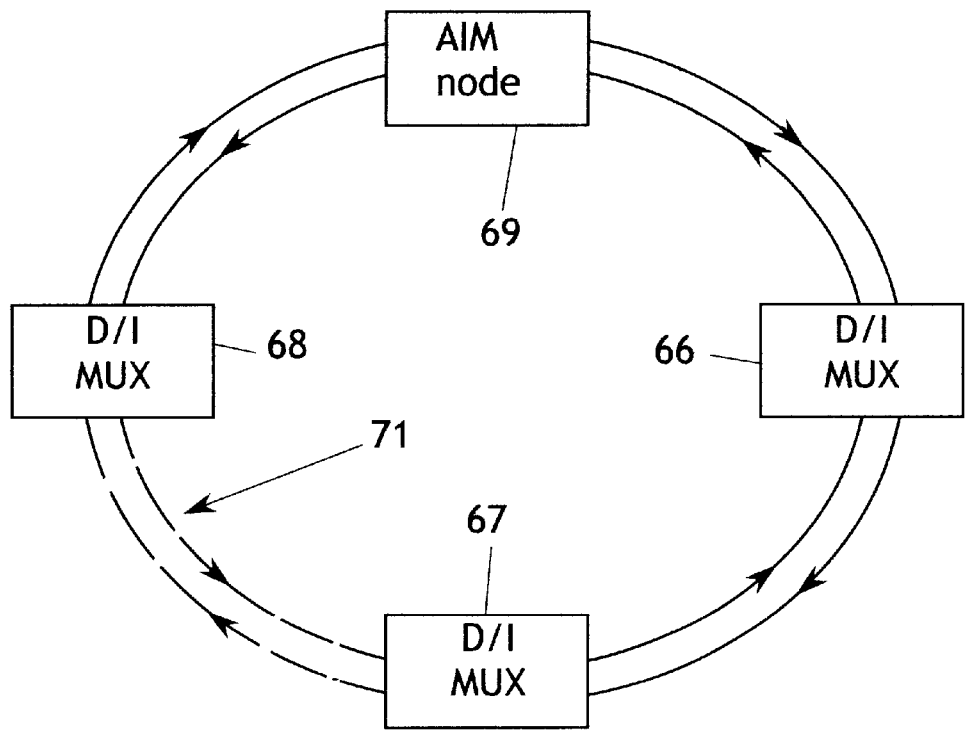
FIG. 16 is a block diagram depicting a fault tolerant ring network composed of reconfigurable intelligent multiplexer nodes of the invention.

Another aspect of fault tolerance made possible by the invention involves automatic loop protection switching. With reference to FIG. 16, an example of automatic loop protection switching includes a plurality of D/I Mux nodes 66, 67, 68 are connected in a ring configuration with an advanced intelligent multiplexer (AIM) node 69 by paired T-1 spans in a loop format. The nodes 66–68 operate in a drop-and-insert mode, using the receive pair from the incoming T-1 span and the transmit pair of the outgoing T-1 span to form an active ring network. In this configuration a total of 24 channels are divided across a reliable network, and each node is assigned channels from the 24 available, and any channel can be dropped off or inserted at any point in the ring. The paired span 71 can be held in standby mode while the remaining spans carry the traffic.

Figure 17:
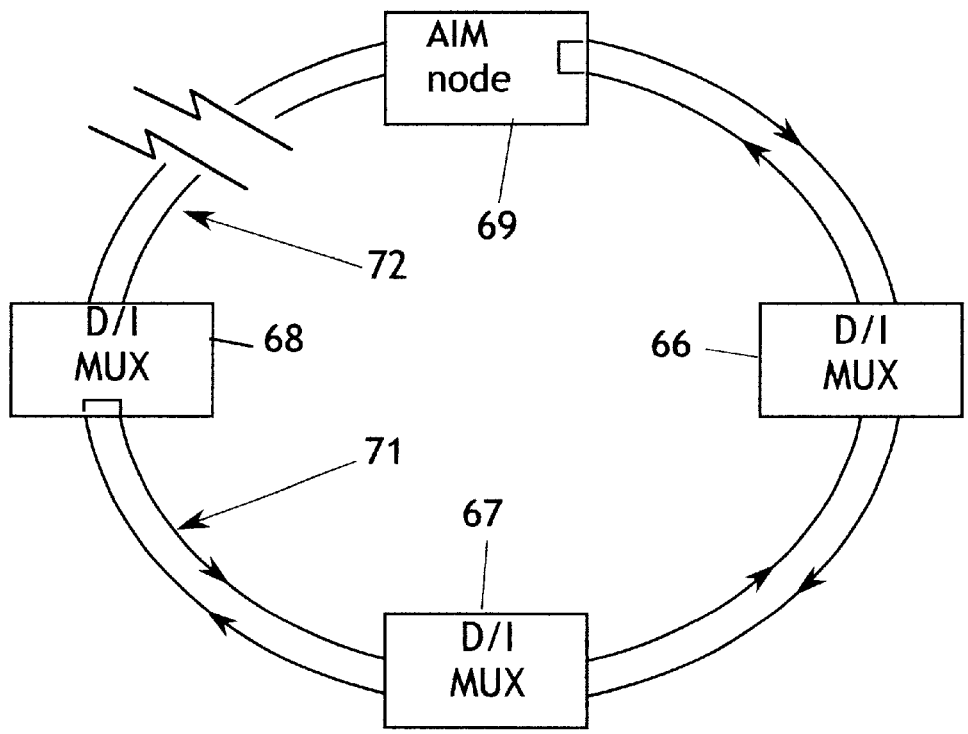
FIG. 17 is a block diagram depicting a fault tolerant ring network as in FIG. 16, showing the adaptation to overcome a span failure.

With reference to FIG. 17, in the event of a span failure such as span 72, the AIM node automatically loops the outgoing transmit and receive spans to reconstitute the network loop, using the standby span 71 in active mode. Drop and continue operation resumes on the newly constituted loop as in normal mode operation, except that the inner loop is used to provide connectivity to the adjacent node. Service interruption is experienced only during the failure detection and changeover process, and during restoration of normal operation.

Figure 18:
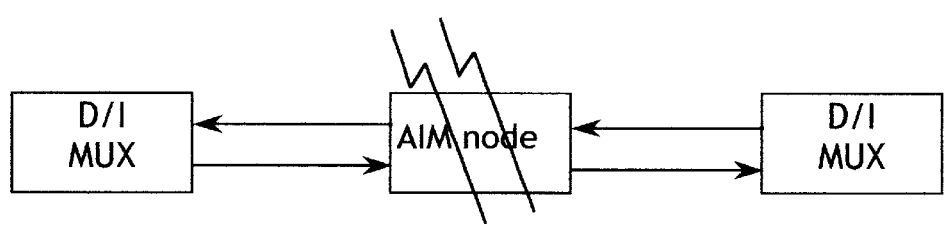
FIG. 18 is a block diagram depicting a linear network of reconfigurable intelligent multiplexer nodes of the invention in a fault tolerant arrangement.
Figures 12, 13:
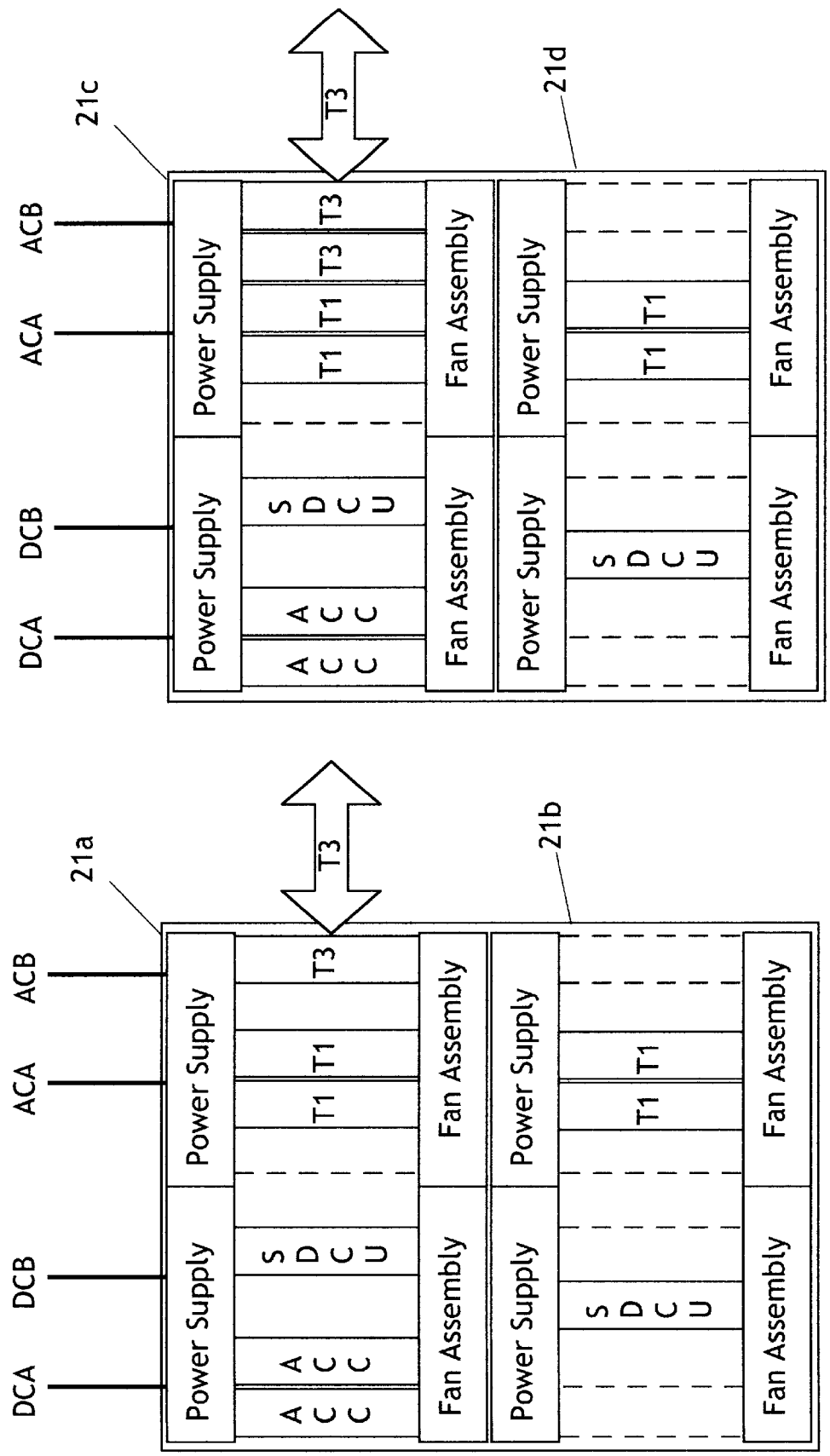

With regard to FIG. 18, an AIM node may be connected in a star configuration to a pair of D/I Mux nodes in drop-and-insert operation. In the event that the AIM node fails completely, the AIM node permits direct pass-through of the traffic between the D/I Mux nodes. However, if the connecting spans are too long, external line powered signal repeaters may be required.

To summarize the important aspects of the invention, it includes a hardware system that enables a user to construct an intelligent multiplexer node of a telecommunications system that is reconfigurable, remappable, sized to accommodate a defined volume of traffic, and modifiable to provide the feature cards and line cards that may be required for anticipated purposes. The node hardware enables direct telecommunications connections to all the feature cards and line cards through backplane connectors, and further provides midplane connectors that join all the feature cards and line cards on a high bandwidth digital bus.

In addition, the Software Shell provides an interface between the virtual world of the network design and the real world of node hardware and span connections. The GUI provides a data base of a plurality of maps, each of which sets all the connections of a network, and enables a user to load, unload, revise, and add new maps to a network. The use of SNMP agents and sub-agents onboard each line card, feature card, and central controller card permits a user to control the network functions by employing a SNMP manager connected to the network through an intranet or internet.

Also, the hardware system permits the design of nodes that are fault tolerant, able to overcome electromechanical systems failures as well as electronic assembly failures. The networks formed by the nodes are also fault tolerant, using the intelligent node concept to effect remapping of connections to preserve priority traffic in the event of span failure, or reconfiguration of span connections to maintain looped networks.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. A reconfigurable, intelligent multiplexer for telecommunications, including:

a shelf structure defining a plurality of slots in adjacent array, said slots each adapted to removably receive a printed circuit card;

a plurality of feature cards, each comprising a printed circuit card having predefined signal processing functions;

a plurality of line cards, each comprising a printed circuit card having predefined telecommunications span-connecting functions;

said shelf structure including backplane connectors associated with each of said plurality of slots, said backplane connectors joined to external telecommunications circuits;

said shelf structure including midplane connectors associated with each of said plurality of slots, said midplane connectors joined to an internal bus circuit;

said pluralities of feature cards and line cards each including backplane connectors adapted to mate with the backplane connectors of said shelf structure and establish connections with external telecommunications equipment;

said pluralities of feature cards and line cards each including midplane connectors adapted to mate with the midplane connectors of said shelf structure and establish interconnections on said internal bus circuit.

2. A telecommunications network comprised of a plurality of nodes and links interconnecting the nodes, including:

a plurality of intelligent multiplexer devices, each comprising one of the nodes of said network;

each of said intelligent multiplexer devices including a plurality of removable circuit cards, said circuit cards including feature cards adapted to perform signal processing functions and line cards adapted to perform telecommunications span-connecting functions;

means for designing a plurality of configurations of each of said intelligent multiplexer devices, each of said configurations comprising selected feature cards and line cards sufficient to provide the signal processing functions and telecommunications span-connecting functions planned for each of said intelligent multiplexers at each node;

said feature cards and line cards each including a microprocessor and associated RAM memory and flash RAM memory, and an embedded operating system stored in said RAM memory.

3. A telecommunications network comprised of a plurality of nodes and links interconnecting the nodes, including:

a plurality of intelligent multiplexer devices, each comprising one of the nodes of said network; said nodes transmitting telecommunications traffic across interconnecting spans;

each of said intelligent multiplexer devices including a plurality of removable circuit cards, said circuit cards including feature cards adapted to perform signal processing functions and line cards adapted to perform telecommunications span-connecting functions;

fault tolerant means for maintaining telecommunications traffic in the event of failure of a portion of the telecommunications network;

each of said nodes routing a respective plurality of communications channels on respective spans, said plurality of channels being labeled with a traffic priority value corresponding to the importance of the communications traffic carried on each channel.

4. A telecommunications network comprised of a plurality of nodes and links interconnecting the nodes, including:

a plurality of intelligent multiplexer devices, each comprising one of the nodes of said network; said nodes transmitting telecommunications traffic across interconnecting spans;

each of said intelligent multiplexer devices including a plurality of removable circuit cards, said circuit cards including feature cards adapted to perform signal processing functions and line cards adapted to perform telecommunications span-connecting functions;

fault tolerant means for maintaining telecommunications traffic in the event of failure of a portion of the telecommunications network;

said plurality of circuit cards in at least one of said intelligent multiplexer devices including a primary central controller card having means for storing and implementing the mapping of the routing of all channels passing through the respective intelligent multiplexer device.

5. A telecommunications network comprised of a plurality of nodes and links interconnecting the nodes, including:

a plurality of intelligent multiplexer devices, each comprising one of the nodes of said network; said nodes transmitting telecommunications traffic across interconnecting spans;

each of said intelligent multiplexer devices including a plurality of removable circuit cards, said circuit cards including feature cards adapted to perform signal processing functions and line cards adapted to perform telecommunications span-connecting functions;

fault tolerant means for maintaining telecommunications traffic in the event of failure of a portion of the telecommunications network;

said plurality of circuit cards in at least one of said intelligent multiplexer devices including a primary line interface unit and a backup line interface unit, and said fault to tolerant means includes means for switching line interface operation from said primary line interface unit to said backup line interface unit in the event of failure of said primary line interface unit.

6. A telecommunications network comprised of a plurality of nodes and links interconnecting, the nodes including:

a plurality of intelligent multiplexer device, each comprising one of the nodes of said network; said nodes transmitting telecommunications trffic across interconnecting spans;

each of said intelligent multiplexer devices including means to perform telecommunications span-connecting functions;

each of said intelligent multiplexer devices including means to perform telecommunications span-connecting functions;

fault tolerant means for maintaining telecommunications traffic in the event of failure of a portion of the telecommunications network;

said plurality of nodes being connected in a ring configuration by paired spans connected between each node, and, in the event of failure of the paired span between any two nodes, said fault tolerant means includes means for reconfiguring said remaining paired spans in a closed loop to maintain communications traffic among all said plurality of nodes.

7. A telecommunications network comprised of a plurality of nodes and links interconnecting the nodes, including:

a plurality of intelligent multiplexer devices, each comprising one of the nodes of said network;

each of said intelligent multiplexer devices including a plurality of removable circuit cards, said circuit cards including feature cards adapted to perform signal processing functions and line cards adapted to perform telecommunications span-connecting functions;

means for designing a plurality of configurations of each of said intelligent multiplexer devices, each of said configurations comprising selected feature cards and line cards sufficient to provide the signal processing functions and telecommunications span-connecting functions planned for each intelligent multiplexer at each node;

said means for designing said plurality of configurations of each intelligent multiplexer device including a computer program for network design and reconfiguration, said computer program including a graphical user interface having screen displays corresponding to each network node and the spans therebetween.

8. A telecommunications network comprised of a plurality of nodes and links interconnecting the nodes, including:

a plurality of intelligent multiplexer devices, each comprising one of the nodes of said network; said nodes transmitting telecommunications traffic across interconnecting spans;

each of said intelligent multiplexer devices including means to perform telecommunications span-connecting functions;

fault tolerant means for maintaining telecommunications traffic in the event of failure of a portion of the telecommunications network;

each of said nodes routing a respective plurality of communications channels on respective spans, said plurality of channels being labeled with a traffic priority value;

said fault tolerant means including means for rerouting said plurality of communications channels in the event of a span failure, said means for rerouting establishing new communications routes on remaining spans, wherein channels of higher traffic priority are routed first before channels of lower traffic priority.

9. A telecommunications network comprised of a plurality of nodes and links interconnecting the nodes, including:
   a plurality of intelligent multiplexer devices, each comprising one of the nodes of said network; said nodes transmitting telecommunications traffic across interconnecting spans;
   each of said intelligent multiplexer devices including means to perform telecommunications span-connecting functions;
   fault tolerant means for maintaining telecommunications traffic in the event of failure of a portion of the telecommunications network;
   said plurality of nodes being connected in a ring configuration by paired spans connected between each node, and said fault tolerant means including means for operating in the event of failure of the paired span between any two nodes to reconfigure said remaining paired spans into a closed loop to maintain communications traffic among all said plurality of nodes.

10. The reconfigurable, intelligent multiplexer of claim 1, wherein each of said feature cards and line cards includes a microprocessor and associated RAM memory and flash RAM memory, and an embedded operating system stored in said RAM memory.

11. The reconfigurable, intelligent multiplexer of claim 10, wherein said feature cards and line cards may be selectively placed in any of said slots of said shelf structure in any combination to configure the multiplexer to have selected signal processing functions and telecommunications span-connecting functions.

12. The reconfigurable, intelligent multiplexer of claim 11, wherein at least one of said feature cards comprises a central controller card having means for controlling digital data communications among said feature cards and line cards on said internal bus circuit.

13. The reconfigurable, intelligent multiplexer of claim 11, further including mapping means for directing the signal processing functions of said feature cards and the telecommunications span-connecting functions of said line cards.

14. The reconfigurable, intelligent multiplexer of claim 13, wherein said feature cards and said line cards each include a respective onboard SNMP Sub-Agent, and further including means for selectively connecting an SNMP Manager to the respective SNMP Sub-Agent of any of said line cards and feature cards.

15. The reconfigurable, intelligent multiplexer of claims 14, wherein said mapping means includes at least one map of connections between and among said feature cards, said map stored in a database connectable to said feature cards.

16. The reconfigurable, intelligent multiplexer of claim 15, further including a computer program for network design and reconfiguration, said computer program including a graphical user interface having screen displays corresponding to said shelf structure and said plurality of slots thereof.

17. The reconfigurable, intelligent multiplexer of claim 16, wherein said graphical user interface includes further screen displays for enabling a user to design and draw telecommunications links and spans to said multiplexer, and for indicating placement of feature cards and line cards in said slots to carry out the signal processing function and telecommunications functions of said multiplexer.

18. The reconfigurable, intelligent multiplexer of claim 17, wherein said computer program includes means for eliciting network design data from the user inputs to said further screen displays and for compiling said network design data into said map of connections between and among said feature cards and line cards.

19. The reconfigurable, intelligent multiplexer of claim 18, wherein said computer program further includes means for transmitting said map to central controller, and to transmit said map to said feature cards and line cards of said multiplexer.

20. The telecommunications network of claim 2, wherein each of said intelligent multiplexer devices includes backplane connector means for connecting said selected feature cards and line cards to external telecommunications circuits and devices.

21. The telecommunications network of claim 20, wherein each of said intelligent multiplexer devices includes midplane connector means for interconnecting said selected feature cards and line cards on an internal data bus circuit.

22. The telecommunications network of claim 21, wherein at least one of said selected feature cards comprises a central controller card, and means on said central controller card for managing communications between and among said selected feature cards and said line cards on said internal data bus circuit.

23. The telecommunications network of claim 2, wherein said means for designing said plurality of configurations of each intelligent multiplexer device includes mapping means for generating a map to direct the signal processing functions of said selected feature cards and the telecommunications span-connecting functions of said selected line cards in each of said intelligent signal multiplexes at each node.

24. The telecommunications network of claim 23, wherein said feature cards and said line cards each include a respective onboard SNMP Sub-Agent, and said means for designing includes an external SNMP Manager, and means for selectively connecting an SNMP Manager to the respective SNMP Sub-Agent of any of said line cards and feature cards.

25. The telecommunications network of claim 24, wherein said mapping means includes at least one map of connections between and among said feature cards of all of the nodes, said map stored in a database connectable to said central controller.

26. The telecommunications network of claim 7, wherein said graphical user interface includes screen displays for enabling a user to design and draw telecommunications links and spans to said multiplexes at said network nodes, and for indicating placement of feature cards and line cards in each intelligent multiplexer device sufficient to carry out the signal processing functions of each respective network node and the span-connecting telecommunications functions drawn between the network nodes.

27. The telecommunications network of claim 26, wherein said computer program includes means for eliciting network design data from the user inputs to said screen displays and for compiling said network design data into a map of internode and intranode connections between and among said feature cards and line cards.

28. The telecommunications network of claim 27, wherein said feature cards each include a respective onboard SNMP Sub-Agent, and further including an external SNMP Manager, and means for selectively connecting said SNMP Manager to the respective SNMP Sub-Agent of any of said feature cards.

29. The telecommunications network of claim 28, wherein said means for eliciting and compiling network design data compiles the intranode and internode connections scheme into a map stored on said central controller.

30. The telecommunications network of claim 29, wherein said map is stored as a SNMP MIB in a database connected to said SNMP Manager.

31. The telecommunications network of claim 30, wherein said computer program further includes means for communicating with the intelligent multiplexer devices of nodes of an existing telecommunications network, and for presenting screen displays to elicit selected changes in signal processing functions at each node and prompt the user with suggested feature card changes for each node.

32. The telecommunications network of claim 31, wherein said computer program further includes screen displays to elicit selected changes in span-connecting functions between nodes, and to prompt the user with suggested line card changes in response to the selected changes in node connections.

33. The telecommunications network of claim 32, wherein said computer program further includes means for compiling said selected changes in signal processing functions at each node and span-connecting functions between nodes into a modified map of internode and intranode connections between and among the selected feature cards and line cards.

34. The telecommunications network of claim 33, wherein said computer program includes means to transmit said modified map of internode and intranode connections to each of said intelligent multiplexer devices and each network node, and to implement said modified map.

35. The telecommunications network of claim 34, wherein at least one of said feature cards of each intelligent multiplexer device comprises a central controller circuit card.

36. The telecommunications network of claim 35, wherein said central controller circuit card includes an onboard web server, and further including a web browser to communicate with said web server of said central controller card.

37. The telecommunications network of claim 35, wherein said central controller card includes a LAN port for direct connection to said SNMP Manager.

38. The telecommunications network of claim 35, wherein said central controller card includes a craft port for direct connection to a control terminal.

39. The telecommunications network of claim 34, wherein said fault tolerant means includes means for rerouting said plurality of communications channels in the event of a span failure, said means for rerouting establishing new communications routes on remaining spans, wherein channels of higher traffic priority are routed first before channels of lower traffic priority.

40. The telecommunications network of claim 4, wherein said fault tolerant means includes a backup central controller card installed in each of said intelligent multiplexer devices, said backup central controller having means for storing and implementing the mapping of the routing of all channels passing through the respective intelligent multiplexer device, and further including means for switching operational control to said backup central controller card in the event of failure of said primary central controller card.

41. The telecommunications network of claim 3, wherein said plurality of nodes are connected in a ring configuration by paired spans connected between each node, and, in the event of failure of the paired span between any two nodes, said fault tolerant means includes means for reconfiguring said remaining paired spans in a closed loop to maintain communications traffic among all said plurality of nodes.

* * * * *